US006983886B2

(12) United States Patent
Natsukari et al.

(10) Patent No.: US 6,983,886 B2
(45) Date of Patent: Jan. 10, 2006

(54) TWO-DIMENSIONAL CODE READER SETTING METHOD, TWO-DIMENSIONAL CODE READER, TWO DIMENSIONAL CODE READER SETTING PROGRAM AND COMPUTER READABLE RECORDING MEDIUM

(75) Inventors: Chikara Natsukari, Osaka (JP); Hisamichi Nakata, Osaka (JP)

(73) Assignee: Keyence Corporation, Osaka (JP)

( * ) Notice: Subject to any disclaimer, the term of this patent is extended or adjusted under 35 U.S.C. 154(b) by 201 days.

(21) Appl. No.: 10/621,090

(22) Filed: Jul. 16, 2003

(65) Prior Publication Data

US 2004/0046024 A1    Mar. 11, 2004

(30) Foreign Application Priority Data

Jul. 19, 2002 (JP) .......................... P.2002-211849

(51) Int. Cl.
*G06K 7/10* (2006.01)

(52) U.S. Cl. .............................. 235/462.1; 235/462.09; 235/462.22

(58) Field of Classification Search ........... 235/462.09, 235/462.1, 462.22, 462.23

See application file for complete search history.

(56) References Cited

U.S. PATENT DOCUMENTS

| 5,504,319 | A | * | 4/1996 | Li et al. ................. 235/462.08 |
| 5,557,091 | A | * | 9/1996 | Krummel ................ 235/462.08 |
| 6,000,614 | A | * | 12/1999 | Yang et al. ................. 235/460 |
| 6,371,371 | B1 | * | 4/2002 | Reichenbach ............... 235/454 |
| 6,616,040 | B1 | * | 9/2003 | Lucera et al. .......... 235/462.01 |

FOREIGN PATENT DOCUMENTS

| JP | 6-76097 | 3/1994 |
| JP | 11-282948 | 10/1999 |

* cited by examiner

*Primary Examiner*—Diane I. Lee
*Assistant Examiner*—Seung H Lee
(74) *Attorney, Agent, or Firm*—Kilyk & Bowersox, P.L.L.C.

(57) ABSTRACT

An object of the present invention is to easily set a camera attachment distance of an image pick-up optical system, a combination of close-up rings and the like. When a user designates a specification of a desirable two-dimensional code such as a code type, a data type, a data volume, a printable space, or printing precision, a cell size and a symbol size of the two-dimensional code and the like are calculated in accordance therewith. Furthermore, an attachment condition of an image pick-up section such as an attachment distance limitation of the image pick-up section or a shift tolerance of a two-dimensional code label is specified. By inputting and calculating the condition for setting the image pick-up optical system of a two-dimensional code reader, thus, an appropriate camera attachment distance, a type of a close-up ring and a standard of a scale of a focusing ring are calculated automatically.

22 Claims, 23 Drawing Sheets

TWO-DIMENSIONAL CODE READER SETTING METHOD, TWO-DIMENSIONAL CODE READER, TWO DIMENSIONAL CODE READER SETTING PROGRAM AND COMPUTER READABLE RECORDING MEDIUM

BACKGROUND OF THE INVENTION

1. Field of the Invention

The present invention relates to a two-dimensional code reader, a two-dimensional code reading method, a two-dimensional code reading program and a computer readable recording medium.

2. Description of the Related Art

At present, various symbols such as a bar code and a two-dimensional code are utilized in the field such as merchandise management. The bar code is also referred to as a one-dimensional code, a linear code or the like, and segments having various widths are linearly arranged adjacent to each other so that information such as alphanumerics can be represented by a bar portion and a blank portion, and a universal product code is represented, for example. On the other hand, the two-dimensional code is also referred to as a two-dimensional symbol, a three-dimensional bar code or the like and is a symbol in which information is arranged vertically and horizontally, and has a feature that a computerization density is high, more information can be stored than that in a bar code and errors can be corrected because of a redundant code. In recent years, therefore, the two-dimensional code has rapidly spread in various fields.

In order to read the bar code and the two-dimensional code, a bar code scanner or a two-dimensional code reader is utilized for an optical type information reader. FIG. 1 is a block diagram showing an example of the structure of a two-dimensional code reader. In the two-dimensional code reader shown in FIG. 1, an image pick-up section 2 for acquiring an image including a two-dimensional code 15 and an illuminating section 3 for providing an illumination when acquiring an image by the image pick-up section 2 are connected to a two-dimensional code reader body to be a decoding section 1. The illuminating section 3 uniformly illuminates a two-dimensional code. The image pick-up section 2 includes image pick-up optical systems, for example, a camera 4 and a lens 5. In the image pick-up section 2, the camera 4 includes an image sensor such as a CCD image element, and image data in a region including a two-dimensional code label are picked up by an image sensing technique using a CCD and the image of the two-dimensional code is projected onto a CCD area sensor and is converted into an electric signal. The signal thus converted is expanded onto a memory in the image pick-up section 2 and is fetched as an image. The two-dimensional code is cut out by an image processing from image data fetched as an image, and is changed into a binary and is thus decoded so that encoded information is read.

Thus, the two-dimensional code is read differently from the bar code and the two-dimensional code is cut and decoded by the image processing. For this reason, an image pick-up optical system such as an image sensor, a camera and a lens for reading an image is required. As compared with a bar code reader which does not require equipment such as a camera or an illuminator and can be handled comparatively easily, accordingly, there is a problem in that the two-dimensional code reader requires a work for setting two-dimensional code reading conditions such as image pick-up conditions. For a user who does not know much about the two-dimensional code, particularly, a work for setting the reading conditions takes a great deal of time and labor and is hard to carry out. Although the two-dimensional code can store information at a high density, the size of a cell to be a minimum unit constituting the two-dimensional code is reduced in some cases. In order to accurately read the two-dimensional code with high precision, it is necessary to reliably capture the two-dimensional code by an image pick-up optical system. More specifically, it is necessary to hold the whole two-dimensional code in the visual field of a finder of a camera and to accurately adjust the focus such that a photograph can be taken as largely as possible in the vicinity of a center and the details can be read. For this purpose, it is necessary to regulate various parameters such as the attachment distance of a camera, the thickness of a close-up lens and the scale of a focusing ring and to set the optimum conditions.

However, the conventional two-dimensional code reader has a drawback that such a setting work is very complicated. In particular, a beginning user cannot understand the meaning of each set item and cannot smoothly carry out a work for moving a focusing regulation direction and a visual field and for shifting a focal position, thereby creating difficulties. Actually, it is necessary to manually carry out confirmation and setting after much trial and error at a site where the two-dimensional code reader is used. Therefore, a great deal of time and labor are required. For example, if the optimum combination of the close-up lenses is to be decided, for example, it is necessary to variously change the number of the close-up rings and the combination thereof and to carry out attachment again. In order to exchange the close-up ring, it is necessary to loosen a screw type ring, to remove a lens from an image pick-up section at each time, to exchange the close-up ring and to attach a new close-up ring again. Such an exchange work requires a great deal of time and labor.

Conventionally, a correspondence table indicating the combination of the correspondence relationship for each parameter has been used to facilitate such a setting. In general, the correspondence table describing, in a matrix, the correspondence relationship between the items, for example, the thickness of a close-up lens to be used for an image pick-up optical system, the attachment distance of a camera, a focusing range, the size of a visual field, the thickness of the close-up ring and the standard of the scale of a focusing ring is printed or belongs to the setting manual of the two-dimensional code reader. A user needs to determine the optimum condition setting such that an optimum two-dimensional code can be read according to the kind of the two-dimensional code to be used by himself (herself), the printing state of the two-dimensional code, an environment and other conditions while comparing the correspondence tables. Also in this method, however, the user actually selects a necessary correspondence table while looking up the manual, and furthermore, manually carries out a work for searching for a desirable combination, which is complicated. Moreover, the correspondence table is to be prepared by hand and can be misplaced. Furthermore, the setting work is complicated for the user who does not know much about the two-dimensional code, and the setting itself cannot be carried out easily. For this reason, the complication cannot be eliminated.

SUMMARY OF THE INVENTION

The present invention has been made in consideration of such conventional problems. An object of the present invention is to provide a two-dimensional code reader setting method, a two-dimensional code read setting device, a two-dimensional code reader setting program and a computer readable recording medium which can readily carry out settings for reading a two-dimensional code.

In order to attain the object, a first aspect of the present invention is directed to a method of setting a two-dimensional code reader for reading a two-dimensional code by using an image pick-up section, including the steps of designating a specification of the two-dimensional code including any of a code type, a model, an error correcting level, a printing pattern, a data type for encoding the two-dimensional code, a data volume, a printable space and printing precision of the two-dimensional code, calculating the specification of the two-dimensional code including any of a cell size and a symbol size of the two-dimensional code in accordance with the designated condition, designating an attachment condition of the image pick-up section including any of an attachment distance limitation of the image pick-up section, a shift tolerance of a two-dimensional code label, presence or absence of rotation, a cell size of the two-dimensional code and a printing pattern, and calculating an attachment specification including any of the attachment distance of the image pick-up section, a focusing range, a size of a visual field, the number of pixels to be allocated to one cell, a total thickness of close-up rings, a combination of a thickness of each of the necessary close-up rings and the number thereof, and a standard of a scale of a focusing ring in accordance with the specification of the calculated two-dimensional code and the attachment condition of the image pick-up section.

Moreover, a second aspect of the present invention is directed to a method of setting a two-dimensional code reader for reading a two-dimensional code by using an image pick-up section, including the steps of designating a specification of the two-dimensional code including at least a volume of data to be encoded into the two-dimensional code and a printable space or a symbol size of the two-dimensional code, and calculating an attachment specification including at least an attachment distance of the image pick-up section and a total thickness of close-up rings in accordance with the calculated two-dimensional code specification.

Furthermore, a third aspect of the present invention is directed to the method of setting a two-dimensional code reader, in addition to the feature according to the second aspect, wherein a cell size of the two-dimensional code is calculated as the specification of the two-dimensional code based on at least the volume of data to be encoded into the two-dimensional code and the printable space or the symbol size of the two-dimensional code and is determined based thereon.

Furthermore, a fourth aspect of the present invention is directed to the method of setting a two-dimensional code reader, in addition to the feature according to the second or third aspect, wherein the cell size of the two-dimensional code is calculated as the specification of the two-dimensional code based on a maximum value which can be permitted as at least the cell size and a resolution of a printer of the two-dimensional code and is determined based thereon.

Furthermore, a fifth aspect of the present invention is directed to the method of setting a two-dimensional code reader, in addition to the feature according to any of the second to fourth aspects, further including the steps of designating an attachment condition of the image pick-up section including at least an attachment distance limitation of the image pick-up section, and calculating an attachment specification including at least an attachment distance of the image pick-up section and a total thickness of the close-up rings based on the specification of the two-dimensional code and the attachment condition of the image pick-up section.

Furthermore, a sixth aspect of the present invention is directed to the method of setting a two-dimensional code reader, in addition to the feature according to any of the second to fifth aspects, further including the steps of designating an attachment condition of the image pick-up section including any of at least a shift tolerance of a two-dimensional code label, presence or absence of rotation and a printing pattern, and calculating an attachment specification including at least an attachment distance of the image pick-up section and a total thickness of the close-up rings based on the specification of the two-dimensional code and the attachment condition of the image pick-up section.

Furthermore, a seventh aspect of the present invention is directed to a method of setting a two-dimensional code reader for reading a two-dimensional code by using an image pick-up section, including the steps of designating a specification of the two-dimensional code including at least a code type of the two-dimensional code, a volume of data to be encoded into the two-dimensional code, a cell size of the two-dimensional code and a printable space or a symbol size of the two-dimensional code, and calculating an attachment specification including at least an attachment distance of the image pick-up section and a total thickness of close-up rings in accordance with the calculated two-dimensional code specification.

Furthermore, an eighth aspect of the present invention is directed to a method of setting a two-dimensional code reader for reading a two-dimensional code by using an image pick-up section, including the steps of designating a specification of the two-dimensional code including at least any of a volume of data to be encoded into the two-dimensional code and a cell size of the two-dimensional code, and calculating an attachment specification including at least an attachment distance of the image pick-up section and a total thickness of close-up rings in accordance with the calculated two-dimensional code specification.

Furthermore, a ninth aspect of the present invention is directed to a method of setting a two-dimensional code reader for reading a two-dimensional code by using an image pick-up section, including the steps of designating a specification of the two-dimensional code including at least any of a cell size of the two-dimensional code and a printable space or a symbol size of the two-dimensional code, and calculating an attachment specification including at least an attachment distance of the image pick-up section and a total thickness of close-up rings in accordance with the calculated two-dimensional code specification.

Furthermore, a tenth aspect of the present invention is directed to a method of setting a two-dimensional code reader for reading a two-dimensional code by using an image pick-up section, including the steps of designating a two-dimensional code reading specification including at least any of a volume of data to be encoded into the two-dimensional code, a printable space or a symbol size of the two-dimensional code, and an attachment distance of the image pick-up section, and calculating an attachment specification including at least a total thickness of close-up rings in accordance with the calculated two-dimensional code reading specification.

Furthermore, an eleventh aspect of the present invention is directed to a method of setting a two-dimensional code reader for reading a two-dimensional code by using an image pick-up section, including the steps of designating a two-dimensional code reading specification including at least any of a volume of data to be encoded into the two-dimensional code, a cell size of the two-dimensional code, and an attachment distance of the image pick-up section, and calculating an attachment specification including at least a total thickness of close-up rings in accordance with the calculated two-dimensional code reading specification.

Furthermore, a twelfth aspect of the present invention is directed to a method of setting a two-dimensional code reader for reading a two-dimensional code by using an image pick-up section, including the steps of designating a two-dimensional code reading specification including at least any of a cell size of the two-dimensional code, and a printable space or a symbol size of the two-dimensional code, and calculating an attachment specification including at least a total thickness of close-up rings in accordance with the calculated two-dimensional code reading specification.

Furthermore, a thirteenth aspect of the present invention is directed to the method of setting a two-dimensional code reader, in addition to the feature according to any of the first to twelfth aspects, wherein at least any of an attachment distance of the image pick-up section related to calculation, a total thickness of close-up rings or a combination of a thickness of each of necessary close-up rings and the number thereof, a standard of a scale of a focusing ring, a length and width of a symbol of the two-dimensional code, a size of one cell, a length and width of a two-dimensional code label having the two-dimensional code printed thereon, a shift tolerance of the two-dimensional code label, presence or absence of rotation, and a relationship between a visual field and a symbol size is displayed in an image.

Furthermore, a fourteenth aspect of the present invention is directed to the method of setting a two-dimensional code reader, in addition to the feature according to any of the first to thirteenth aspects, wherein a candidate group of the total thickness of the close-up rings or the combination of the thickness of each of the necessary close-up rings and the number thereof is calculated, a focusing range is visually displayed for each of the candidates, any of the candidate groups displayed side by side is selected so that at least any of an attachment distance of the image pick-up section related to the selected candidate, a focusing range, a size of a visual field, the number of pixels to be allocated to one cell, the total thickness of the close-up rings, the combination of the thickness of each of the necessary close-up rings and the number thereof, and a standard of a scale of a focusing ring is displayed.

Furthermore, a fifteenth aspect of the present invention is directed to the method of setting a two-dimensional code reader, in addition to the feature according to any of the first to fourteenth aspects, further including the step of setting an operation of the two-dimensional code reader including any of specification of a code to be read by the two-dimensional code reader, specification of a reading operation, output, predictive maintenance information and communication.

Furthermore, a sixteenth aspect of the present invention is directed to a two-dimensional code read setting device for setting a two-dimensional code reading operation for reading a two-dimensional code by using an image pick-up section and decoding the two-dimensional code by using a two-dimensional code reader. The two-dimensional code read setting device includes a two-dimensional code specification designating section for designating a specification of the two-dimensional code including any of a code type, a model, an error correcting level, a printing pattern, a data type for encoding the two-dimensional code, a data volume, a printable space and printing precision of the two-dimensional code read by the image pick-up section, a two-dimensional code specification calculating section for calculating the specification of the two-dimensional code including any of a cell size and a symbol size of the two-dimensional code in accordance with the condition designated by the two-dimensional code specification designating section, an image pick-up section attachment condition designating section for designating an attachment condition of the image pick-up section including any of an attachment distance limitation of the image pick-up section, a shift tolerance of a two-dimensional code label, presence or absence of rotation, a cell size of the two-dimensional code and a printing pattern, and an image pick-up section attachment specification calculating section for calculating an attachment specification including any of the attachment distance of the image pick-up section, a focusing range, a size of a visual field, the number of pixels to be allocated to one cell, a total thickness of close-up rings, a combination of a thickness of each of the necessary close-up rings and the number thereof, and a standard of a scale of a focusing ring in accordance with the specification of the two-dimensional code which is calculated by the two-dimensional code specification calculating section and the attachment condition of the image pick-up section which is designated by the image pick-up section attachment condition designating section.

Furthermore, a seventeenth aspect of the present invention is directed to the two-dimensional code reader setting device, in addition to the feature according to the sixteenth aspect, further including a two-dimensional code reading operation setting section for setting an operation of the two-dimensional code reader including any of specification of a code to be read by the two-dimensional code reader, specification of a reading operation, output, predictive maintenance information and communication.

Furthermore, an eighteenth aspect of the present invention is directed to a two-dimensional code reader setting program for setting a two-dimensional code reader for reading a two-dimensional code by using an image pick-up section. The program causes a computer to implement functions of designating a specification of the two-dimensional code including any of a code type of the two-dimensional code, a model, an error correcting level, a printing pattern, a data type to be encoded into the two-dimensional code, a data volume, a printable space and printing precision, calculating the specification of the two-dimensional code including any of a cell size and a symbol size of the two-dimensional code in accordance with the designated condition, designating an attachment condition of the image pick-up section including any of an attachment distance limitation of the image pick-up section, a shift tolerance of a two-dimensional code label, presence or absence of rotation, a cell size of the two-dimensional code and a printing pattern, and calculating an attachment specification including any of the attachment distance of the image pick-up section, a focusing range, a size of a visual field, the number of pixels to be allocated to one cell, a total thickness of close-up rings, a combination of a thickness of each of the necessary close-up rings and the number thereof, and a standard of a scale of a focusing ring in accordance with the specification of the calculated two-dimensional code and the attachment condition of the image pick-up section.

Furthermore, a nineteenth aspect of the present invention is directed to the two-dimensional code reader setting program, in addition to the feature according to the eighteenth aspect, which further causes the computer to implement a function of: saving an image of the two-dimensional code acquired by the image pick-up section.

Furthermore, a twentieth aspect of the present invention is directed to the two-dimensional code reader setting program, in addition to the feature according to the eighteenth or nineteenth aspect, which further causes the computer to implement a function of: printing set contents which are calculated.

Furthermore, a twenty-first aspect of the present invention is directed to the two-dimensional code reader setting program, in addition to the feature according to any of the eighteenth to twentieth aspects, which further causes the computer to implement a function of: saving the calculated set contents in a file.

Furthermore, a twenty-second aspect of the present invention is directed to a computer readable recording medium recording the two-dimensional code reader setting program according to any of the eighteenth to twenty-first aspects. The recording medium includes a magnetic disk, an optical disk, a magneto-optical disk, a semiconductor memory and other media capable of storing a program, for example, a CD-ROM, a CD-R, a CD-RW, a flexible disk, a magnetic tape, an MO, a DVD-ROM, a DVD-RAM, a DVD-R, a DVD-RW, a DVD+RW and a DVD+R.

DESCRIPTION OF THE PREFERRED EMBODIMENT

Figure 1:
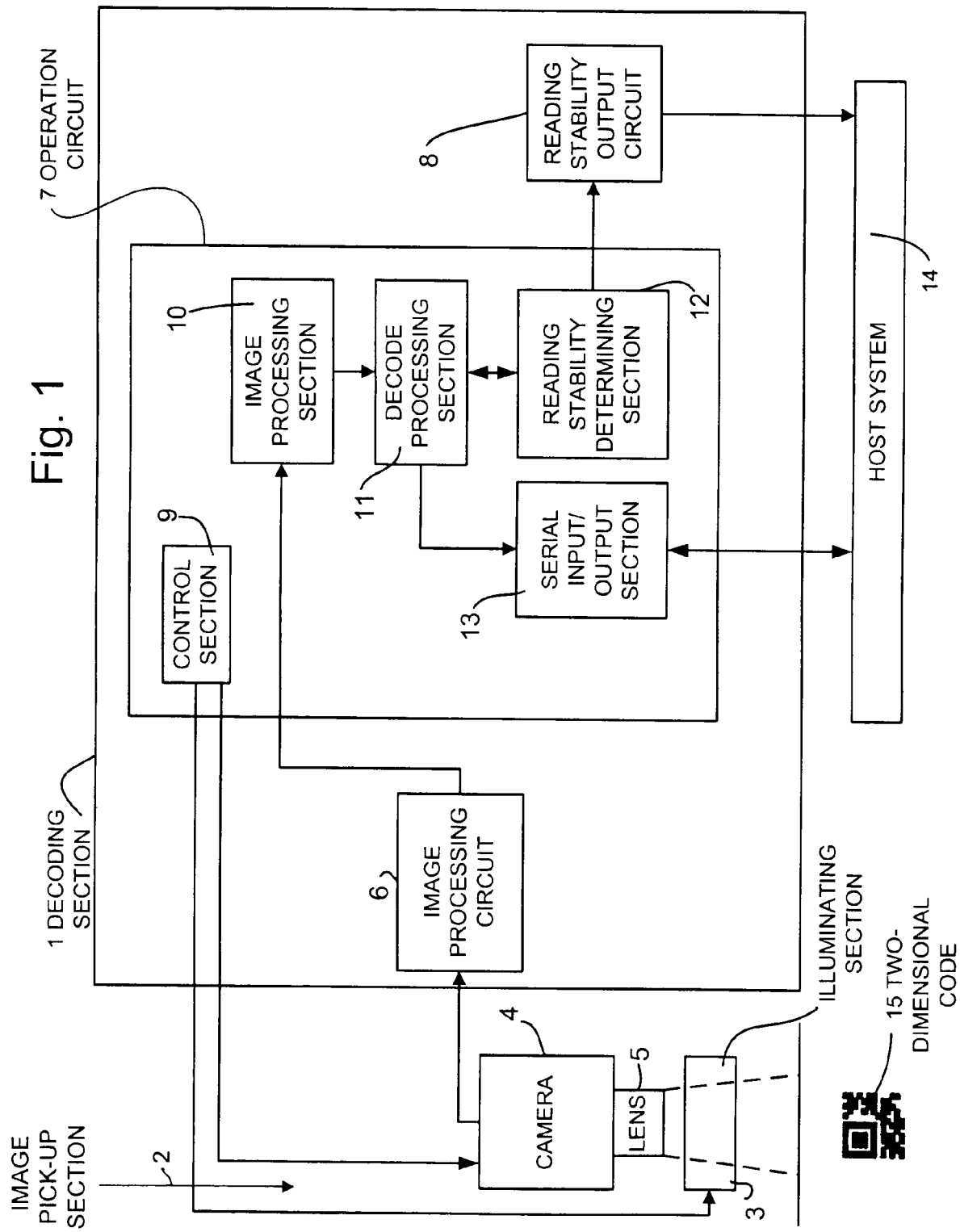
FIG. 1 is a block diagram showing the structure of a two-dimensional code reader according to an embodiment of the present invention.

Hereinafter, an embodiment of the present invention will be described with reference to the drawings. In the following embodiment, a two-dimensional code reader setting method, a two-dimensional code read setting device, a two-dimensional code reader setting program and a computer readable recording medium which serve to make clarify the present invention are illustrated. The present invention is not limited to the two-dimensional code reader setting method, the two-dimensional code read setting device, the two-dimensional code reader setting program and the computer readable recording medium which will be described below. Moreover, members described in the appended claims are not specified to members in the embodiments. Moreover, the sizes of members shown in the drawings and the positional relationships therebetween are exaggerated for clearer description in some cases. Referring to each of the elements constituting the present invention, a plurality of elements may be constituted by the same member and one member may be shared by a plurality of elements.

In this specification, the two-dimensional code reader setting method, the two-dimensional code read setting device, the two-dimensional code reader setting program and the computer readable recording medium are not limited to systems for reading a two-dimensional code and setting the reading and a device and a method for carrying out input, output, display, calculation, communication and other processes in relation to the reading of a two-dimensional code and the read setting on a hardware basis. The device and method for implementing processes on a software basis are also included in the scope of the present invention. For example, a device and a system for incorporating a software, a program, a plug-in, an object, a library, an applet, a compiler, a module or a macro to be operated on a specific program in a general-purpose circuit or computer to carry out the read setting itself for a two-dimensional code or a process related thereto are also equivalent to the two-dimensional code read setting device or the two-dimensional code reader setting program according to the present invention. In this specification, moreover, the computer also can include a general-purpose or special electronic computer, a work station, a terminal, a portable electronic apparatus, a mobile telephone such as PDC, CDMA, W-CDMA or FORMA, PHS, PDA, a pager, a smart telephone and other electronic devices. In this description, furthermore, the program is not always used as a single unit but can also be used with a positioning of a means for functioning as a part of a specific computer program, software or services, a means for functioning with a call if necessary, a means to be provided as a service in an environment such as OS, a means for operating with a terminate and stay resident in the environment, and/or a means for operating on a background or other support programs.

The terminals of the computer to be used in the embodiments of the present invention or the like, and a server and a computer for operations, control, input and output, display and various processes which are to be connected thereto or other peripheral apparatuses such as printer are electrically connected through serial connection or parallel connection such as IEEE1394, RS-232C, RS-422 or USB or a network such as 10BASE-T, 100BASE-TX or 1000BASE-T. The connection is not limited to physical connection using a cable but may be wireless LAN such as IEEE802.11b or IEEE802.11a or wireless connection utilizing an electric wave, infrared rays or optical communication such as Bluetooth. Furthermore, the recording medium for exchanging data and saving the setting can utilize a memory card, a magnetic disk, an optical disk, a magneto-optical disk, a semiconductor memory or the like.

In this specification, moreover, printing includes a means for printing a two-dimensional code by an ink jet printer or the like, a means for marking a two-dimensional code by a laser marker, a direct marker or the like, or a means for representing a two-dimensional code by a method such as transfer.

First Embodiment

FIG. 1 is a block diagram showing an example of the structure of a two-dimensional code reader. The above-mentioned means are not shown. In the two-dimensional code reader shown in FIG. 1, a decoding section 1 for decoding a two-dimensional code acts as a two-dimensional code reader body. An image pick-up section 2 for acquiring an image including a two-dimensional code 15 and an illuminating section 3 for providing an illumination when acquiring an image by the image pick-up section 2 are connected to the two-dimensional code reader body to be the decoding section 1. The illuminating section 3 includes a light source such as a plurality of red light emitting diodes (LED), for example. Preferably, the two-dimensional code is illuminated uniformly. The illuminating section 3 is provided in such a position that the two-dimensional code of an object can be illuminated effectively and is provided in the vicinity of a lens 5 of the image pick-up section 2, for example.

The image pick-up section 2 includes image pick-up optical systems such as a camera 4 and the lens 5. The image pick-up section 2 picks up image data in an area including a two-dimensional code label portion by image sensing using a CCD image element, for example, and projects the image of the two-dimensional code onto a CCD area sensor and converts the image into an electric signal. The signal thus converted is expanded onto a memory in the image pick-up section 2 and is fetched as an image. This process can also be transmitted to and carried out in the two-dimensional code reader body. In the case where a pin hole camera is used, the lens is not required.

Decoding Section 1

The decoding section 1 to be the two-dimensional code reader body shown in FIG. 1 includes an image processing circuit 6, an operation circuit 7, and a reading stability output circuit 8. The image processing circuit 6 serves to receive image data acquired by the image pick-up section 2 and to carry out a predetermined image processing. The image processing includes A/D conversion for converting image data including analog shading information and the like into a digital signal. For example, the image data are converted into a digital signal having 8-bit 256 gradations.

The operation circuit 7 can include a CPU, an MPU, a system LSI, a DSP, a special hardware and the like, and includes a control section 9 for transmitting a signal to control the optical systems such as the camera 4 and the lens 5 and the illuminating section 3, an image processing section 10 for further processing a digital signal processed by the image processing circuit 6, a decode processing section 11 for decoding a signal to have a binary value or a multi-value by the image processing section 10, a reading stability determining section 12 for determining a reading stability and a serial input/output section 13 for outputting the decoded signal to the outside.

The image processing section 10 first searches for a finder pattern from the A/D converted image data and specifies and cuts out the area of a two-dimensional code included in the image data correspondingly. Furthermore, the boundary of a cell is decided from the image data of the two-dimensional code thus cut out and is divided into cells, and the image data of each cell are changed into a binary value based on a predetermined threshold. The change into a binary value is detected by an image processing such as the type, position, size, origin, inclination, or distortion of the two-dimensional code included in the fetched image and the light and darkness of a cell to be a minimum unit constituting the two-dimensional code, for example, white and black are acquired as binary data of 1 or 0. Multi-valued data as well as binary data can also be utilized.

Decode Processing Section 11

The decode processing section 11 serves to decode binary or multi-valued data. For the decoding, reference is made to a symbol character table indicative of the contrast relationship between coded data. Based on the table, the data are converted and decoded into symbol character data corresponding to the binary data. Furthermore, the decode processing section 11 verifies whether the decoded data are correct or not based on a predetermined checking method. If an error is found on the data, correct data are calculated by an operation using an error correcting function. The error correcting function is determined through a method employed by a two-dimensional code to be used.

Reading Stability Determining Section 12

On the other hand, the reading stability determining section 12 calculates a shading contrast in a predetermined reading stability determining area in the image data of the two-dimensional code which is cut out, and determines a reading stability as compared with a predetermined stability threshold. The shading contrast mainly indicates a difference in a lightness between white and black or a ratio thereof if the two-dimensional code is constituted by achromatic white and black, and furthermore, includes a difference or ratio of a chromaticity or color saturation and a contrast difference is expressed in any of them or their combination. Consequently, a color two-dimensional code can also be processed. As one exemplary method, several points decided to belong to white (1) and black (0) are extracted from points included in the A/D converted image data included in the reading stability determining area respectively, and the mean value or total value of the digital signals of shading information for each of the white and the black is calculated, and a difference or a ratio is set to be a contrast. By using the contrast, a reading stability to be an index indicative of the reading stability of a two-dimensional code is determined. More specifically, the stability is decided by a comparison with a predetermined stability threshold as will be described below. For the points to be extracted, several predetermined coordinate points are previously selected in the set reading stability determining area. For example, if a finder pattern is the double square of a QR code, the vertexes of four corners of each frame of the white and the black and the points of contour portions are extracted. The number of the points to be extracted is eight for each of the white and the black, for example, and is thus set such that a sufficient mean value or total value can be calculated. A method of extracting several points and determining a contrast by a mean value or a total value can be processed at a high speed by decreasing the number of operation stages.

As another method, alternatively, respective mean values or modes of the white and the black may be obtained for all the points included in the reading stability determining area and a difference or ratio thereof may be set to be a contrast. In this method, all the points are utilized to obtain the mean value or the mode. Therefore, the contrast is accurate, and at the same time, misreading is generated depending on the reading conditions and the calculation is carried out based on a portion in which the decision of the white and the black is read erroneously. Under the condition that printing and illumination states are excellent and the misreading is rarely generated, all the points can be practically used sufficiently. It is possible to decide an authenticity on the basis of the degree of use of the error correcting function, for example.

The shading information cannot be known from the binary image data. For this reason, data which have not been binary are used. Multi-valued data can also be utilized in place of the binary data. For the decision of shading, moreover, a contrast of the area decided to be the white and the area decided to be the black is checked if the two-dimensional code is constituted by the white and the black, and a contrast for each color, for example, a contrast such as a hue, a lightness or a color saturation is checked for each of the colors if a color constituting the two-dimensional code is another color. Thus, the reading stability is determined. Furthermore, the reading stability determining area is preset and the finder pattern of the two-dimensional code or the like can be utilized. In an area in which the pattern of the white and black or the light and darkness is predetermined like a finder pattern, it is easy to decide the degree of the necessity of the contrast.

For example, the contrast is compared with a predetermined stability threshold. When the contrast is greater than the stability threshold, it is decided that the stability is excellent. If the contrast is smaller than the stability threshold, it is decided that the reading stability is reduced. Thus, a two-stage evaluation for one threshold can be carried out. In addition, the stability threshold can be set to have an upper limit stability threshold and a lower limit stability threshold, and a three-stage evaluation of the upper limit stability threshold or more, the upper limit stability threshold to the lower limit stability threshold, and the lower limit stability threshold or less can be carried out. Furthermore, three stability thresholds or more may be provided to carry out a multistage evaluation.

Alternatively, the reading stability may be changed into a numeric value by a predetermined algorithm and the numeric value may be outputted in place of such a stepwise evaluation. For example, there are methods of calculating the absolute value of a difference between the contrast and the stability threshold and multiplying the difference by a predetermined coefficient to set a reading stability, and a method of exactly outputting the absolute value as the reading stability.

Moreover, the contrast itself may be outputted as the reading stability. In the case where the contrast is A/D converted into 8-bit 256 gradations, for example, it is displayed as a value of 0 to 255. In the case where the contrast itself is to be used, furthermore, it is not necessary to separately provide a stability threshold. The user decides the reading stability by seeing the contrast.

Setting of Stability Threshold

The stability threshold is set to have an appropriate value according to an environment in which a two-dimensional code is used, for example, printing and marking states such as the PCS (Print Contrast Signal) of the two-dimensional code, a surrounding brightness, the effect of an illumination and the like. For example, in the case where the two-dimensional code is printed on a paper having a high contrast, the stability threshold is set to be great. To the contrary, when the contrast is low as in the case where marking is put on a metal, the stability threshold is set to be small. The user can optionally set the stability threshold. The user changes a general stability threshold set as a default value into a desirable stability threshold by means of the stability threshold setting section provided in the two-dimensional code reader. In the case where the upper limit stability threshold and the lower limit stability threshold are to be set, the setting is carried out to obtain the (upper limit stability threshold)>the (lower limit stability threshold). Moreover, the two-dimensional code reader may be caused to automatically carry out the setting. In this case, the user is caused to input the condition of the use of the two-dimensional code, or the device side automatically detects the condition, and a stability threshold corresponding to the same condition is calculated in the device. Furthermore, the stability threshold can also be regulated automatically by following a change in the conditions.

The reading stability thus determined by the reading stability determining section 12 is sent to the serial input/output section 13 or the reading stability output circuit 8. Consequently, a notice of the reading stability is given. Even if the two-dimensional code can be read, the user is notified of a reduction in the reading stability. Therefore, the user can take a necessary countermeasure before the reading cannot be carried out. Thus, it is possible to prevent the two-dimensional code reader from suddenly becoming unreadable.

Reading Stability Output Circuit 8

Furthermore, the reading stability output circuit 8 includes a reading stability output section and is connected to the reading stability determining section 12 and outputs, to the outside, a reading stability determined by the reading stability determining section 12. The output is sent to a host system 14, and furthermore, a display section such as a special monitor can be provided separately to notify the user of the reading stability by the display thereon. Moreover, the reading stability output circuit 8 can also output, to the outside, a reading stability reduction signal for giving a notice of a reduction in the reading stability when the reading stability calculated by the reading stability determining section 12 is lower than a predetermined alarm threshold and can also give an alarm.

The reading stability determined by the reading stability determining section 12 is thus outputted from the reading stability output circuit 8 to be a special I/O terminal, and furthermore, the reading stability can be added to the decoded data and can be transferred as serial data from the serial input/output section 13. In this case, the reading stability may be added from the reading stability determining section 12 through the decode processing section 11 and may be transmitted to the serial input/output section 13, and furthermore, the reading stability may be directly transmitted from the reading stability determining section 12 to the serial input/output section 13.

Host System 14

The host system 14 can utilize a general-purpose or special computer or the like, and serves to receive data on the two-dimensional code which are decoded, thereby carrying out a predetermined processing. The two-dimensional code reader body and the host system 14 are connected into a data communicable state. For a data communication, a one-way communication for transmitting data from the two-dimensional code reader body to the host system 14 is enough. For a two-way communication, it is also possible to transmit a change in various setting operations or an operation instruction from the host system 14 to the two-dimensional code reader body.

The type of the two-dimensional code which can be utilized in the present invention includes a QR code, a micro QR code, a data matrix (Data code), a Veri code, an Aztec code, PDF417, a Maxi code and the like. The two-dimensional code has a stack type and a matrix type, and the present invention can also be applied to both of the two-dimensional codes. The two-dimensional code is fixed onto an object by a method of sticking, onto an object, a label having a two-dimensional code printed or marked thereon, a method of marking a two-dimensional code on an object itself or the like. The present invention can also be used for a one-dimensional bar code, other data symbols, OCR for character recognition and the like without specifying a symbol to be a reading object into a two-dimensional code irrespective of a name. For example, in an application which cannot be used by a laser for bar code reading, it is necessary to read a bar code by using an optical image pick-up system. Thus, the present invention can be used as a bar code reader.

Two-dimensional Code Reader Setting Program

Next, description will be given to a two-dimensional code reader setting program for setting a two-dimensional code reader. The two-dimensional code reader setting program is installed in a computer connected to the two-dimensional code reader as a host system and is thus executed. The computer installing the two-dimensional code reader setting program carries out a communication with the two-dimensional code reader and transmits and receives necessary information, thereby performing setting. The communication is carried out by a serial communication through an RS-232C cable or a USB cable, for example.

The computer installing the program functions as a two-dimensional code read setting device. The two-dimensional code read setting device includes a two-dimensional code specification designating section for designating the desirable specification of a two-dimensional code, a two-dimensional code specification calculating section for calculating the specification of an actual two-dimensional code in accordance with the designated condition, an image pick-up section attachment condition designating section for designating the attachment condition of an image pick-up section, and an image pick-up section attachment specification calculating section for calculating an actual attachment specification in accordance with the specification of the calculated two-dimensional code and the attachment condition of the image pick-up section which is designated by the image pick-up section attachment condition designating section, and furthermore, a two-dimensional code reading operation setting section for setting the operation of the two-dimensional code reader. It is apparent that a two-dimensional code read setting device constituted by a special hardware can also be used as described above in addition to a device installing a program in a general-purpose computer. Moreover, the two-dimensional code reader itself can also serve as a two-dimensional code read setting device having a self-two-dimensional code read setting function. In this case, the calculating circuit 7 shown in FIG. 1 functions as the two-dimensional code specification designating section, the two-dimensional code specification calculating section, the image pick-up section attachment condition designating section, the image pick-up section attachment specification calculating section and the two-dimensional code reading operation setting section.

FIGS. 3 to 18 show an example of the image of the user interface screen of the two-dimensional code reader setting program. On the screen shown in these drawings, an exemplary procedure is displayed like a button on the left side and a set screen is displayed on the right side when each button is selected. The flow of setting is shown in a flow chart of FIG. 2.

It is apparent that the arrangement, shape, display, size, coloring, and pattern of each input column, each button or the like can be changed appropriately on these screens. It is also possible to make a layout which can be seen more easily by a change in a design in which an evaluation or a decision can readily be displayed or operated. For example, it is also possible to input each item in a wizard format and to cause a user to answer a question, thereby carrying out necessary settings. In the following, moreover, a detail set screen is displayed on another window or is provided in the same window in some cases. It is apparent that one of the cases is changed or both of them are used together.

On the user interface screen of these programs, an ON/OFF operation for buttons or input columns are virtually provided, and the input of numeric values and instructions are designated by an input device disposed in a computer installing the two-dimensional code reader setting program. In this description, "press down" includes that click or selection is carried out by the input device to falsely perform the press-down in addition to the operation for physically touching the buttons. An input/output device is connected to a computer by a cable or wireless, or is fixed to the computer. Examples of a general input device include various point devices such as a mouse, a keyboard, a slide pad, a track point, a tablet, a joy stick, a console, a jog dial, a digitizer, a write pen, a ten-key keypad, a touch pad, an acupoint and the like. Moreover, these input/output devices are not limited to only the operation of the program but can also be utilized for the operation of a hardware such as the two-dimensional code read setting device. By utilizing a touch screen or a touch panel for a display itself for displaying an interface screen, furthermore, a user can directly touch a screen by hand to carry out the input or operation, or can also use a voice input and other existing input means or use them together.

In addition to a manner in which the setting is carried out from the input/output device connected to the computer installing the two-dimensional code reader setting program, it is also possible to incorporate a program or hardware for a two-dimensional code reader setting in the two-dimensional code reader, thereby carrying out the setting by only the two-dimensional code reader. In this case, the input/output device is provided in or connected to the two-dimensional code reader and a monitor for setting or the like is connected if necessary.

FIGS. 3 to 18 show an example of the image of the user interface screen of the two-dimensional code reader setting program. On the screen shown in the drawings, an exemplary procedure is displayed like a button in setting order on the left side. As each button is selected, a set screen is displayed on the right side.

Figure 2:
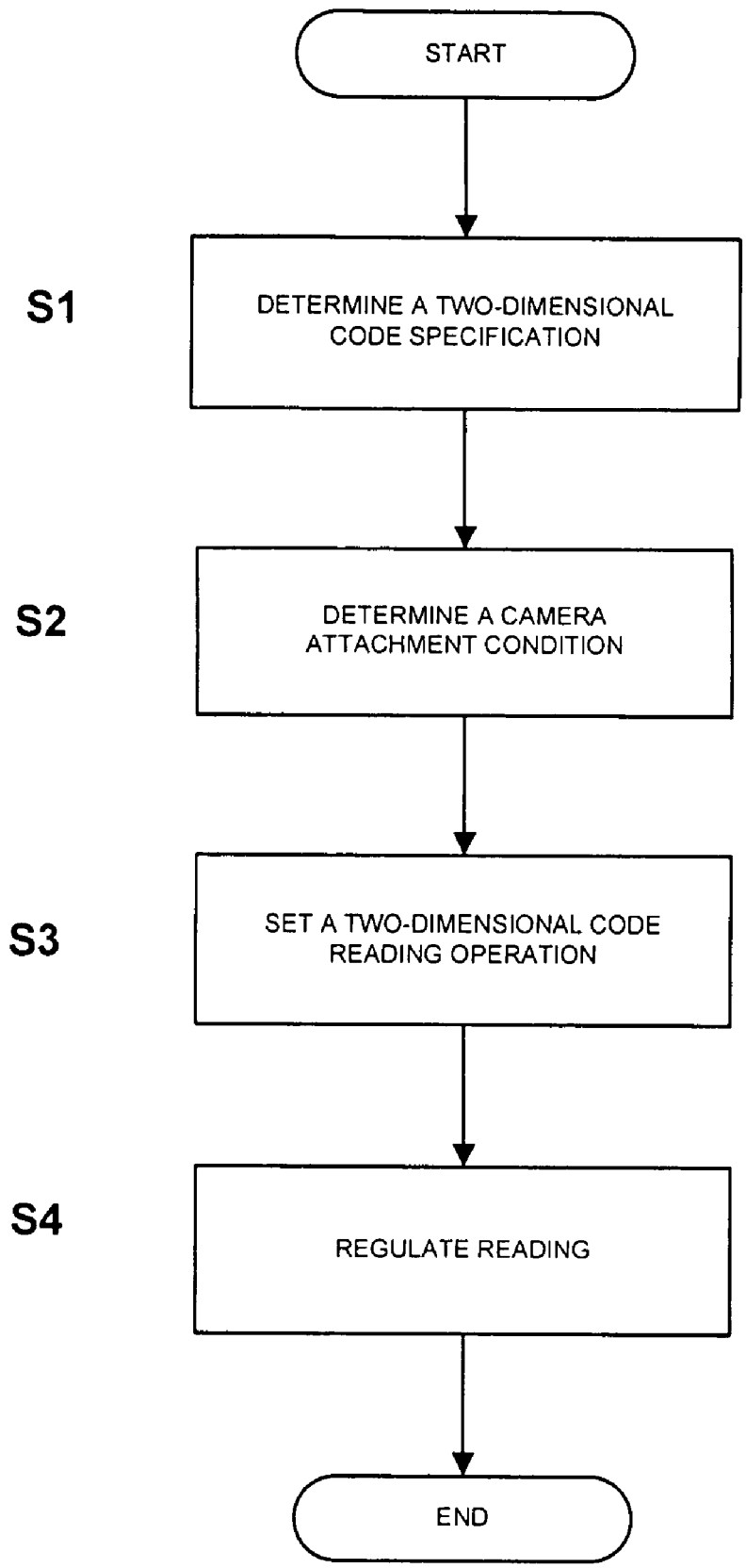
FIG. 2 is a flow chart showing a flow of a two-dimensional code reader setting program according to the embodiment of the present invention.

The two-dimensional code reader setting program includes four steps, S1 to S4 shown in the flow chart of FIG. 2 as a basic procedure. It is not necessary to always carry out the setting in accordance with the procedure shown. As will be described below, the determination of the specification of a two-dimensional code at the step S1 can be skipped and a user can also directly designate the specification of the two-dimensional code at the step S2. Moreover, the operation of the two-dimensional code reader can be set at the step S3 independently of the steps S1 and S2. Accordingly, it is also possible to execute such a method of use that a program is activated and only the step S3 is set to end the processing. Furthermore, the program can save the set contents and the last set contents can be called automatically at time of the activation. Therefore, it is also possible to carry out reading regulation at the step S4 with default setting. Thus, the method of using the program is not limited to only the procedure for carrying out the steps S1 to S4 in order. Description will be given to each set screen.

Condition Designation (Step S1 Determination of Specification of Two-dimensional Code)

Figure 3:
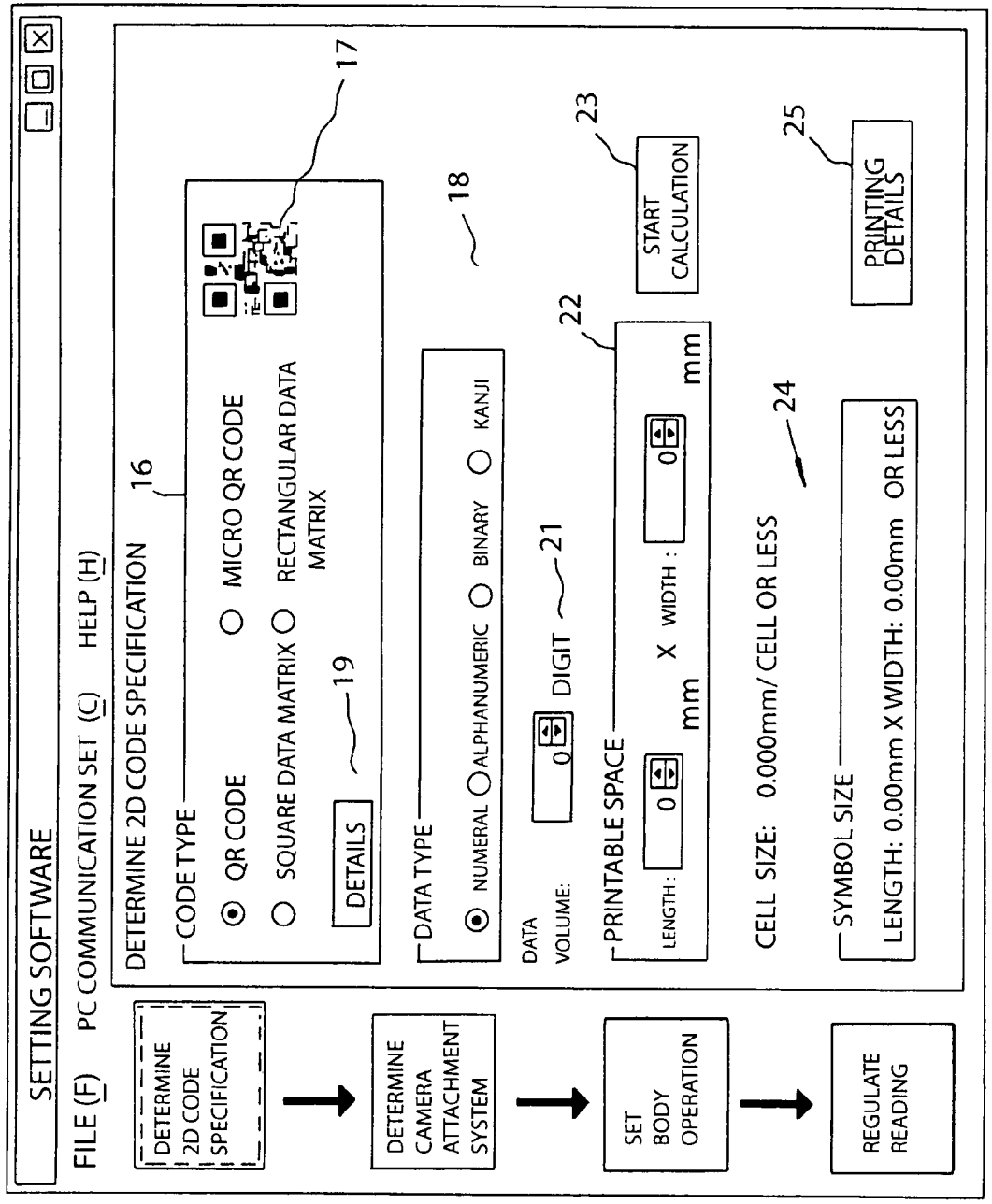
FIG. 3 is an image diagram showing a screen for determining the specification of a two-dimensional code in the specification determining step of the two-dimensional code.

FIG. 3 shows the image screen of the two-dimensional code reader setting program for calculating the specification of the two-dimensional code. On this screen, the specification of the two-dimensional code to be a reading object is determined. Therefore, the type and printing condition of data to be encoded into a two-dimensional code are selected. Items to be inputted include a code type, a data type, a data volume and a printable space. The code type of the two-dimensional code includes a QR code, a micro QR code, a square data matrix and a rectangular data matrix as selection candidates in a "code type" designation column 16 in the example of FIG. 3, and any of them is selected by means of a radio button. In the present invention, it is apparent that the type of the two-dimensional code is not limited to these four types but other two-dimensional codes and bar codes can also be given as the selection candidates.

The user can set the type of the two-dimensional code, a redundancy thereof and an error correcting function according to uses, purposes and the like. For example, if the two-dimensional code is printed on an object having a high contrast, for example, a paper, accurate reading can be expected to some degree. Therefore, the error correcting function having a low level can be sufficient. On the other hand, in the case where the two-dimensional code is silk printed on a board, it is supposed that the contrast can be insufficient. Therefore, it may be necessary to have the error correcting function to some degree. Thus, any setting of the two-dimensional code can be determined depending on the use conditions.

Moreover, a two-dimensional code sample display column 17 for displaying the sample of the selected two-dimensional code is provided on the right side. When the code type is changed, the display of the sample is also varied correspondingly. Furthermore, a selectable item in a "data type" designation column 18 in a lower stage is subjected to gray-out corresponding to the two-dimensional code selected in the code type. Thus, it is possible to select only a data type which can be set corresponding to each code type.

Figure 4:
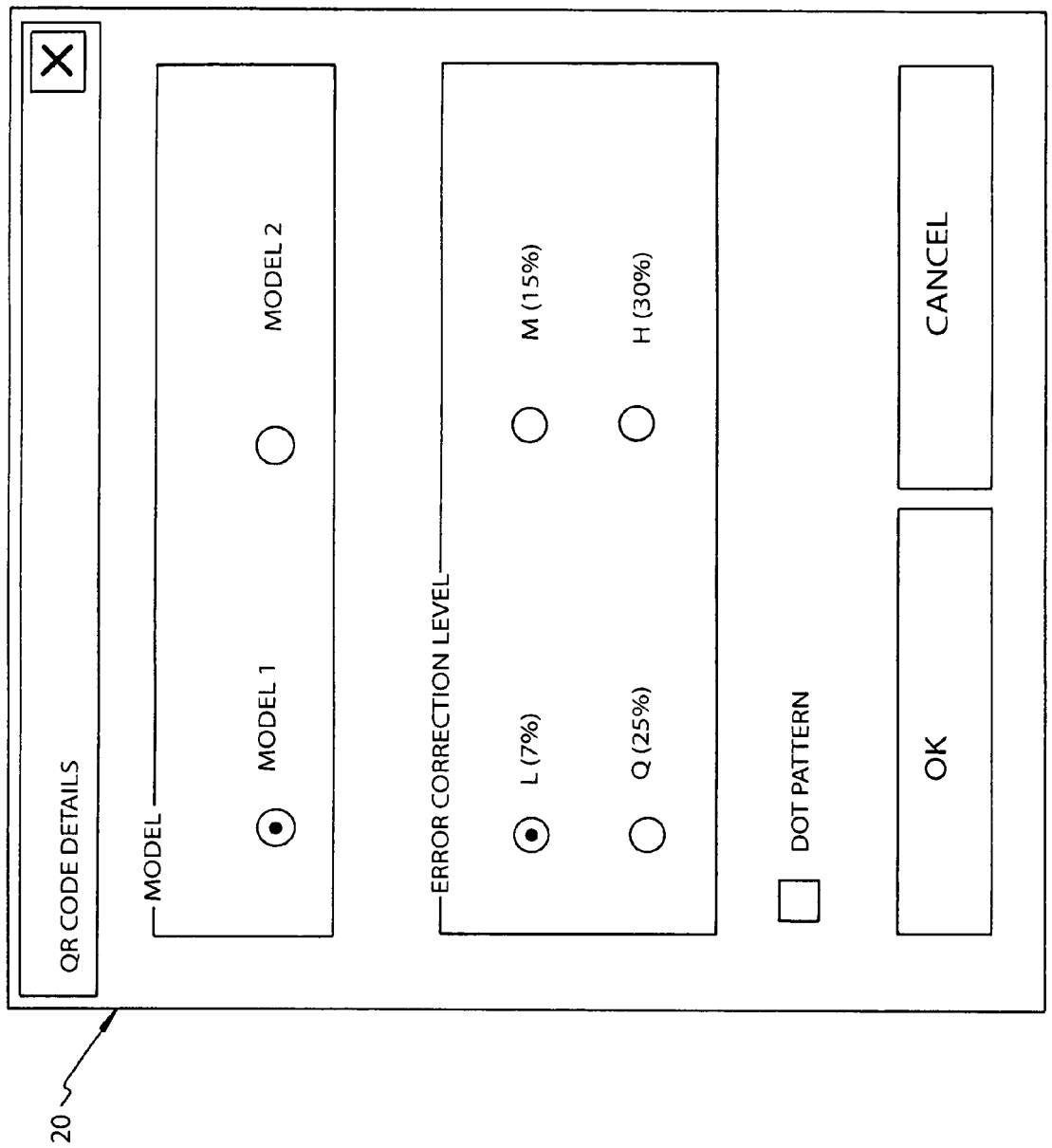
FIG. 4 is an image diagram showing a two-dimensional code detail set screen in the specification determining step of the two-dimensional code.

When a "detail . . . " button 19 of a "code type" designation column 16 is pressed down, a two-dimensional code detail set screen 20 shown in FIG. 4 is opened in another window and detailed setting can be carried out according to the selected two-dimensional code. In the example of FIG. 4, a model, an error correcting level and a dot pattern for a printing pattern can be changed as an example corresponding to the QR code. For this screen, an appropriate screen is displayed depending on the type of the selected two-dimensional code.

The printing pattern mainly indicates the presence of the printing dot pattern. The printing pattern includes a normal pattern (an ordinary pattern) and a dot pattern. In the dot pattern, a cell constituting a symbol is circularly constituted. Therefore, the adjacent cells are slightly separated from each other, and the dot pattern is generated when printing or marking is carried out like a dot by laser marking or direct marking. In general, an option can be selected when the two-dimensional code is a QR code or a data matrix.

In the "data type" designation column 18, moreover, numerals, figures, alphanumerics, binary, and kanji can be selected by means of the radio button.

Furthermore, a "data volume" designation column 21 designates the number of digits of data specified in the data type. For example, the number of digits of data is designated by the number of digits when the data type is the numeral or figure, by the number of characters when the data type is the alphanumerics or kanji, and by the number of bytes when, the data type is the binary.

In addition, a "printable space" designation column 22 designates a size of a length and width in a maximum printable range.

When a "calculation start" button 23 is pressed down in the screen of FIG. 3 after the input is completed, the two-dimensional code reader setting program calculates and determines whether or not a two-dimensional code coincident with the condition inputted by the user can be created based on the same condition. If it is determined that the two-dimensional code can be created, a maximum value of one side of a cell size and a maximum value of the size of a symbol are displayed in a size of a length and width on a calculation result display column 24. Furthermore, a "printing detail" button 25 can be pressed down in the gray-out state.

Figure 5:
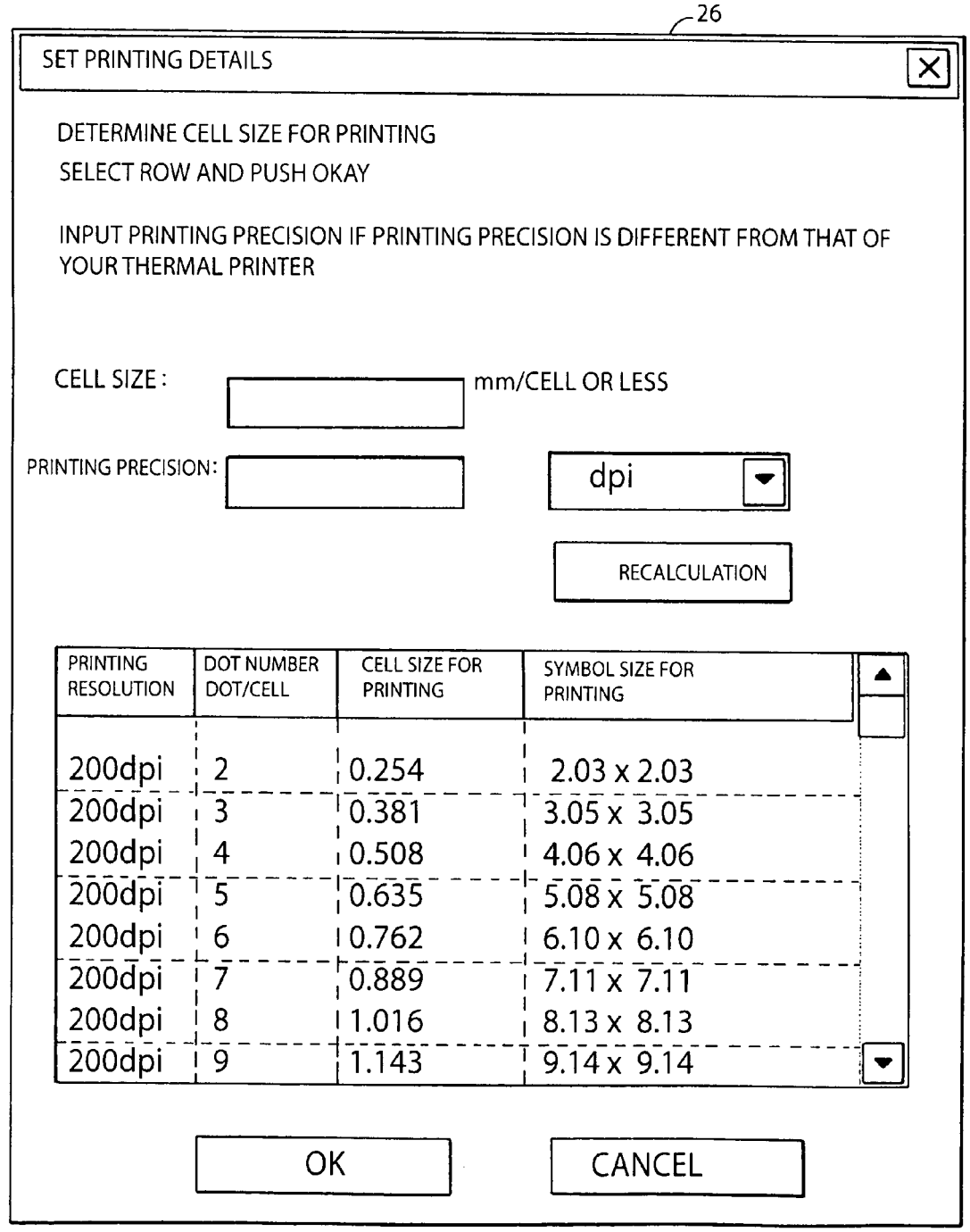
FIG. 5 is an image diagram showing the detail set screen of printing in the specification determining step of the two-dimensional code.

When the "printing detail" button 25 is pressed down, a printing detail set screen 26 shown in FIG. 5 is newly opened in a window, and a cell size to be printed can be designated. Consequently, the number of dots acting as minimum units to be printed by a printer for printing a two-dimensional code to which one cell to be a minimum unit constituting a two-dimensional code is allocated is designated corresponding to the resolution of the printer. When the number of the dots to be allocated to one cell is increased, the printing can be carried out more accurately and precision can be enhanced, and furthermore, the size of a two-dimensional code symbol to be printed is also increased. The two-dimensional code reader setting program calculates the size of one dot corresponding to the resolution of the printer and calculates the size of one cell to be actually printed and the size of the two-dimensional code symbol corresponding to the number of the dots to be allocated to one cell respectively, thereby displaying a candidate group. The user selects an optimum combination from the candidate group depending on the resolution of the printer to be used and the size of the symbol.

In the case where it is determined that the two-dimensional code cannot be created, an error message indicating that the two-dimensional code cannot be created is simply displayed on the calculation result display column 24, and furthermore, the reason and a recommended value for eliminating the reason can be presented and the user can be urged to carry out input again. For example, an alarm message indicating that a printable space is too small, a data volume is too large or the like is displayed, and any set value to be printable, for example, a change of a data type into . . . , or a change of the number of digits into . . . , or a change of a printable space into . . . × . . . as a solution, is presented in another window.

Specification of Two-dimensional Code

Description will be given to an example of an algorithm for determining the specification of a two-dimensional code to be executed when the "calculation start" button 23 is pressed down in the screen of FIG. 3.

(1) First of all, a necessary code size is obtained based on a code type, a data type, and a data volume. The code size indicates the number of cells per one symbol side and a code size is defined by a version. The relationship between the code type, the data type, the data volume, and the code size is determined, and for example, a version 1 (21 cells×21 cells) is set in the case where the two-dimensional code is a QR code, a model 2, alphanumeric 10 digits and an error correcting level M. When the dot pattern is selected based on the details of the code type, the maximum value of the code size is limited by the specification of the two-dimensional code reader.

(2) As a result, if the code size exceeds the theoretical maximum code size, impossible creation is decided to be NG. The theoretical maximum code size is represented by: (n×safety coefficient)/m. In the expression, m represents the pixel allocation number of a CCD and is set to have a value of 5 or 8, for example. In the case where the printing pattern is a normal pattern, generally, five pixels are allocated on the CCD. In the case where the printing pattern is a dot pattern, eight pixels are allocated on the CCD. Moreover, n represents a pixel number (X, Y) of the CCD and is set to be (640, 480), for example. Furthermore, a value of 0.9 or the like is inputted as the safety coefficient for perfectly holding a two-dimensional code in a visual field.

(3) Next, a cell size in the printing of a code over a full printable space is calculated from a printable space and a code size (including an external shape in Data Matrix). At this time, the cell size is set to be a "provisional maximum cell size". The provisional maximum cell size is represented by: (provisional maximum cell size [mm])=(printable space [mm])/((code size)+(margin size)×2). For example, when the printable space is 10 mm×10 mm and the code size is 21 cells×21 cells, the provisional maximum cell size is set to be 0.345 mm.

(4) Furthermore, the size of a symbol in the printing of a two-dimensional code with the provisional maximum cell size obtained in preceding step (3) above is calculated. The size of the symbol is represented by (symbol size [mm])= (cell size [mm])×((code size)+(margin size)×2). In the case of a square code and a square printable space, (symbol size)=(printable space) is obtained.

(5) For all the combinations of close-up lenses, there is calculated a camera attachment distance in which the size of the symbol obtained in preceding step (4) above is 90% or less in the y-direction of a visual field. For example, when it is premised that the position determination precision of a work (a reading object including a two-dimensional code) during an application, the rotation of the work and the installation condition of a camera are not limited in consideration of only a cell size, a position resolution, and a visual field size, and one cell is allocated to 5 or 8 pixels of the CCD, the maintenance of a necessary visual field is calculated. As an example, the conditions are satisfied when the close-up ring which can be used is 0.5 mm, 1 mm, 5 mm, 10 mm, and 22 mm, when the cell size is 0.345 mm and the necessary visual field is 10 mm, and when the combination of the close-up rings is 0.5 mm, 1 mm, 5 mm, 5.5 mm, 6 mm, and 6.5 mm.

In the case where a rectangular data matrix is selected as the two-dimensional code, the size of the symbol is set to be a length of a long side. Moreover, the attachment distance of the camera is set to the condition that the length of the long side is 90% in the x-direction of the visual field. If a solution cannot be obtained, NG is set. If the solution can be obtained, the "provisional maximum cell size" obtained in preceding step (3) above is set to the "maximum value of the cell size". In the case where the two-dimensional code is a data matrix code, an external shape is changed to carry out recalculation. If the size of the external shape is changed to satisfy the constraints of the printing space and the visual field, they are presented as recommended values to the user.

On the other hand, in the case where it is decided that the two-dimensional code of the specification to satisfy the designated conditions cannot be created (NG), the conditions for satisfying the specification are recalculated and are presented to the user. The conditions for the presentation include a change in a data type (it is calculated whether kanji→alphanumerics→figures can be set in order), a change in an error correcting level (the calculation is in order of H, Q, M, and L in the case of only a QR code and a micro QR code), a change in a printing space (a cell size is set to have a value of 0.025 mm and a necessary printing space is recalculated), a change in a data volume and the like.

Printing Detail Setting

Furthermore, description will be given to an example of an algorithm related to the printing detail setting. Herein, an optimum cell size and an optimum symbol size are calculated corresponding to the resolution of a printer for printing a two-dimensional code in place of the maximum values of the cell size and the symbol size.

(1) When the "printing detail" button 25 is pressed down in the screen of FIG. 3, the printing detail set screen 26 in FIG. 5 is represented.

(2) In order to print the cell having the "maximum value of the cell size" obtained above in 200 dpi, 300 dpi, 400 dpi, and 600 dpi corresponding to the resolution of the printer, the number of dots to be printed per cell and the maximum value (n (max)) of the number of the dots per cell are obtained. A method of calculating the (n (max)) is obtained as a maximum of n to satisfy (maximum value [mm] of cell size)>1/(resolution [dpi] of printer)×25.4×n. The cell size is calculated as (cell size [mm])n×25.4/(resolution [dpi] of printer). Moreover, the size of a symbol is calculated as (symbol size [mm])=(cell size [mm])×((code size)×(margin size)×2).

(3) Referring to the dot number (n (max)) obtained in preceding step (2) above, the resolution (200 dpi, 300 dpi, 400 dpi, 600 dpi), the number of dots per cell, the cell size, and the symbol size are obtained and are displayed on the printing detail set screen 26.

(4) When the resolution of the printer is high and n (max)>2 is obtained, the calculation of preceding step (3) above is carried out from n=2 to n=n (max) and a value is displayed. If n (max) is more than 20, the calculation is stopped with 20. Referring to the result of the calculation displayed in FIG. 5, when the head of each column is clicked, the column is sorted into a key and is displayed.

In the printing detail set screen 26 of FIG. 5, furthermore, when the user inputs an optional cell size, the above-mentioned operation is carried out for a resolution designated into the input column of "printing precision" by the user and the result of the operation is displayed on a list in a lower part. In this case, the results of the operation related to 200 dpi, 300 dpi, 400 dpi, and 600 dpi are not displayed.

The user selects a row for displaying a desirable value from the list of the results of the operation obtained as described above. Then, when an "OK" button is pressed down in the printing detail set screen 26 of FIG. 5, the printing detail set screen 26 is closed to return to a screen for determining the specification of a two-dimensional code in FIG. 3. In this case, "cell size to be printed" and "symbol size to be printed" in the row selected by the user are caused to reflect the cell size and the symbol size which are displayed in the calculation result display column 24 of FIG. 3, and furthermore, a character of ". . . mm/cell or less" in a cell size column is changed into "mm/cell". When the "printing detail" button 25 of FIG. 3 is pressed down again, the calculation is carried out based on "maximum value of cell size" obtained in the "specification of two-dimensional code" as well as the cell size obtained in the "printing detail setting" which is displayed.

Based on the maximum values of the cell size and the symbol size which are calculated as described above, the image pick-up section attachment condition is calculated. More specifically, the attachment distance of the image pick-up section, the thickness of the close-up ring and the standard recommended value of the focusing ring are calculated based on the f value of a lens, a distance between the principal points of the lens, a lens length, the number and thickness of the close-up rings to be used, the adjustment range of the focusing ring, one pixel size of a CCD, the number of pixels and the like to be parameters, and are set to be the default values of the attachment conditions of the image pick-up section. The attachment distance of the image pick-up section indicates a distance from a work to the tip of the lens. Moreover, the attachment distance limitation of the image pick-up section indicates an attachment distance desired by the user and implies that the attachment distance of the image pick-up section is set within a range specified by the user. In the following embodiments, a camera is used as the image pick-up section.

Step S2 Determination of Camera Attachment Condition

Figure 6:
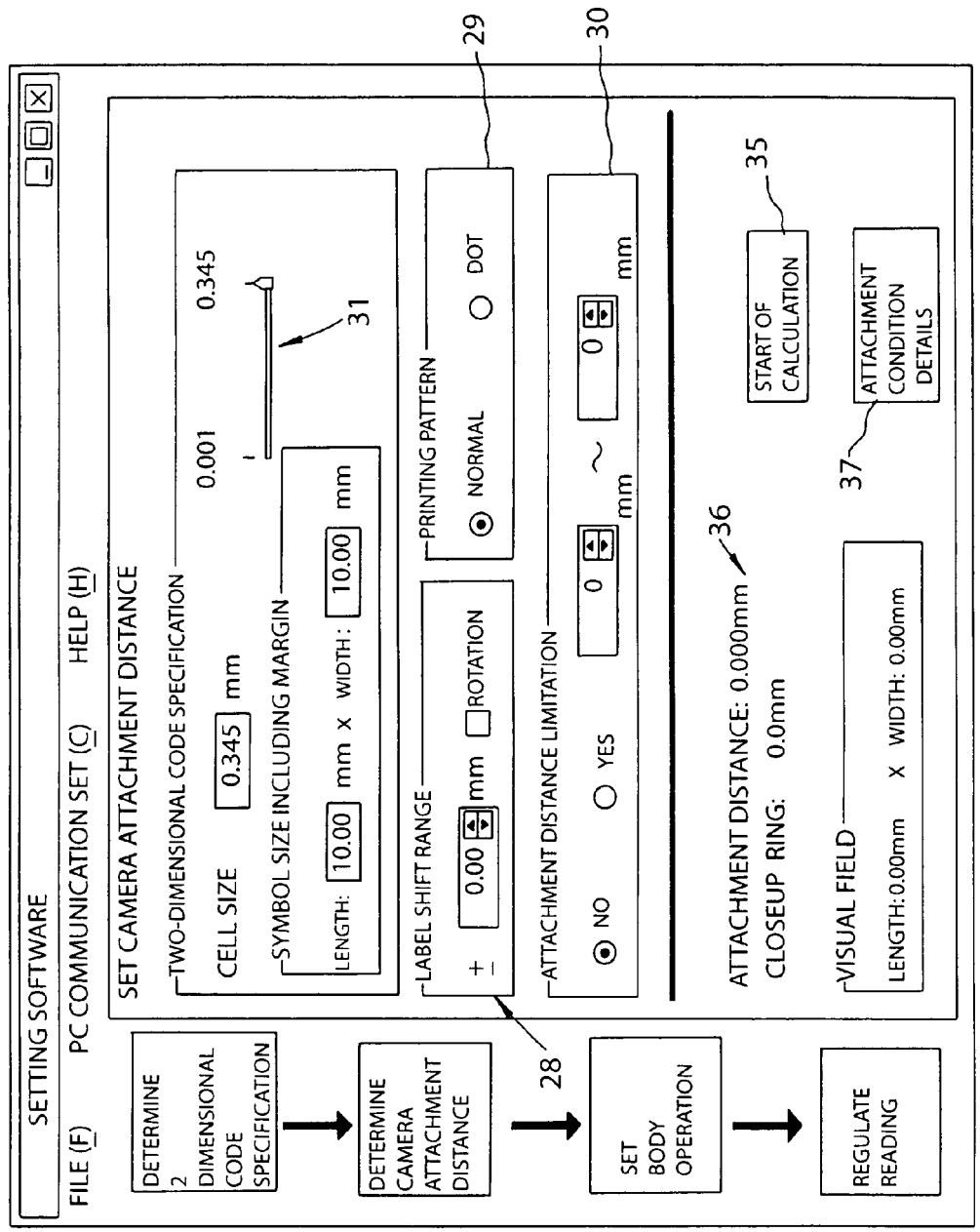
FIG. 6 is an image diagram showing a set screen for determining the attachment conditions of a camera including a "no calculation" button having a symbol size in the setting of the camera attachment conditions.

At the step S2, the attachment distance of the camera, the thickness of the close-up ring, and the standard of the focusing ring are determined as the attachment conditions of the camera. FIG. 6 shows a user interface screen for determining the attachment condition of the camera. The user designates, from FIG. 6, a "two-dimensional code specification" 27, a "two-dimensional code label shift tolerance" 28, a "printing pattern" 29 and a "desired attachment distance" 30 as conditions for attaching the camera.

For the two-dimensional code specification, the lengths and widths of the cell size, and the symbol size constituting a two-dimensional code are specified by numeric values. In the case where the operation is executed at the step S1, the calculated values are inputted as default values and the user can regulate these values. The user can directly input desirable numeric values. If the slider 31 provided on the right side is dragged, the cell size and the symbol size can be changed continuously and numeric values corresponding thereto are automatically inputted to the input column. If the user designates the cell size, the symbol size can be operated automatically. In this case, a "symbol size calculation" button which will be described below is not displayed.

Figure 7:
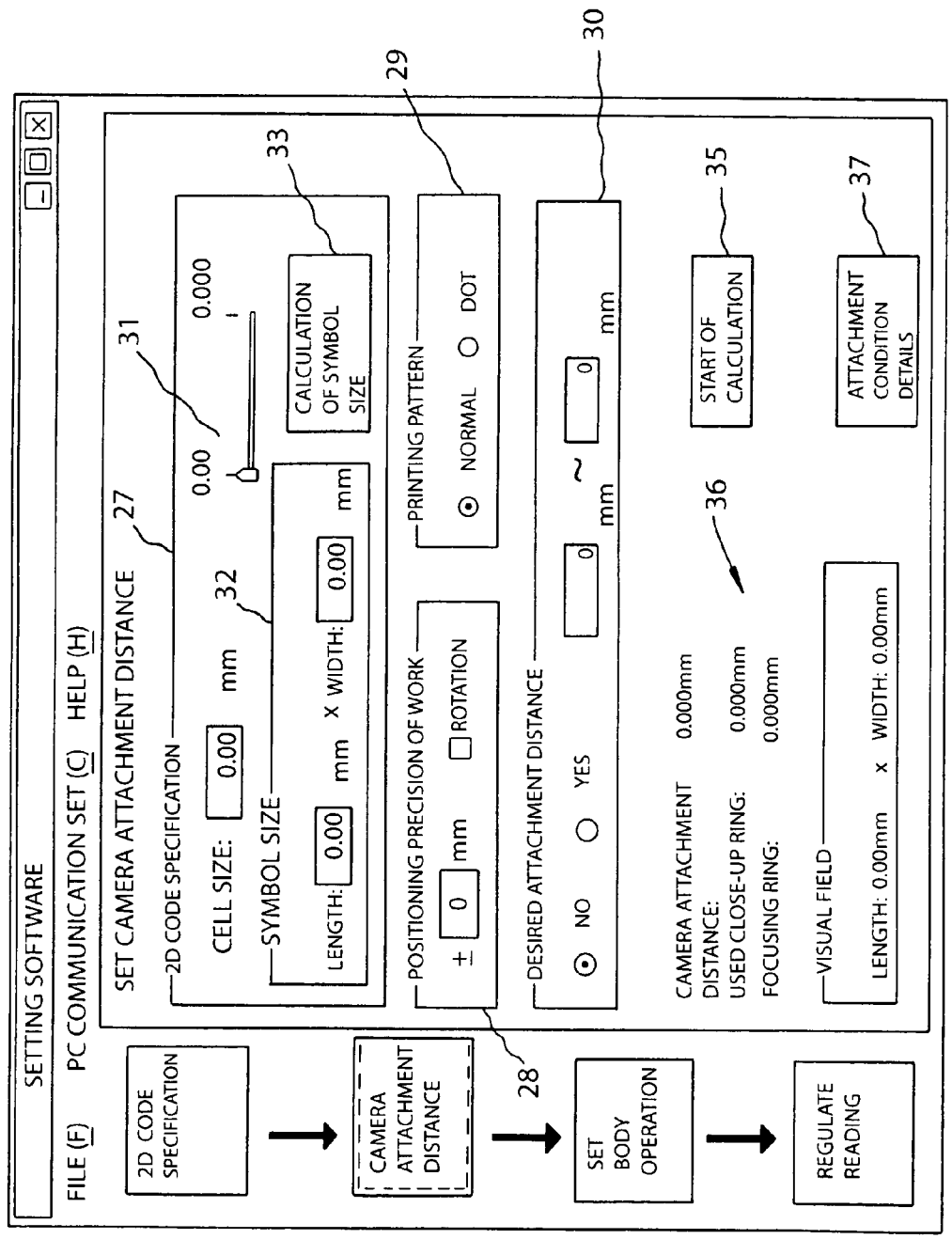
FIG. 7 is an image diagram showing a set screen for determining the attachment conditions of a camera capable of calculating the symbol size in the setting of the camera attachment conditions.

Alternatively, the user can directly designate the specification of the two-dimensional code without executing the step S1. This example is shown in FIG. 7. In this case, the step S1 is skipped. For this reason, operation values are not inputted as defaults in the cell size and the symbol size and the user directly inputs a numeric value into each of the input columns.

Calculation of Symbol Size

Figure 8:
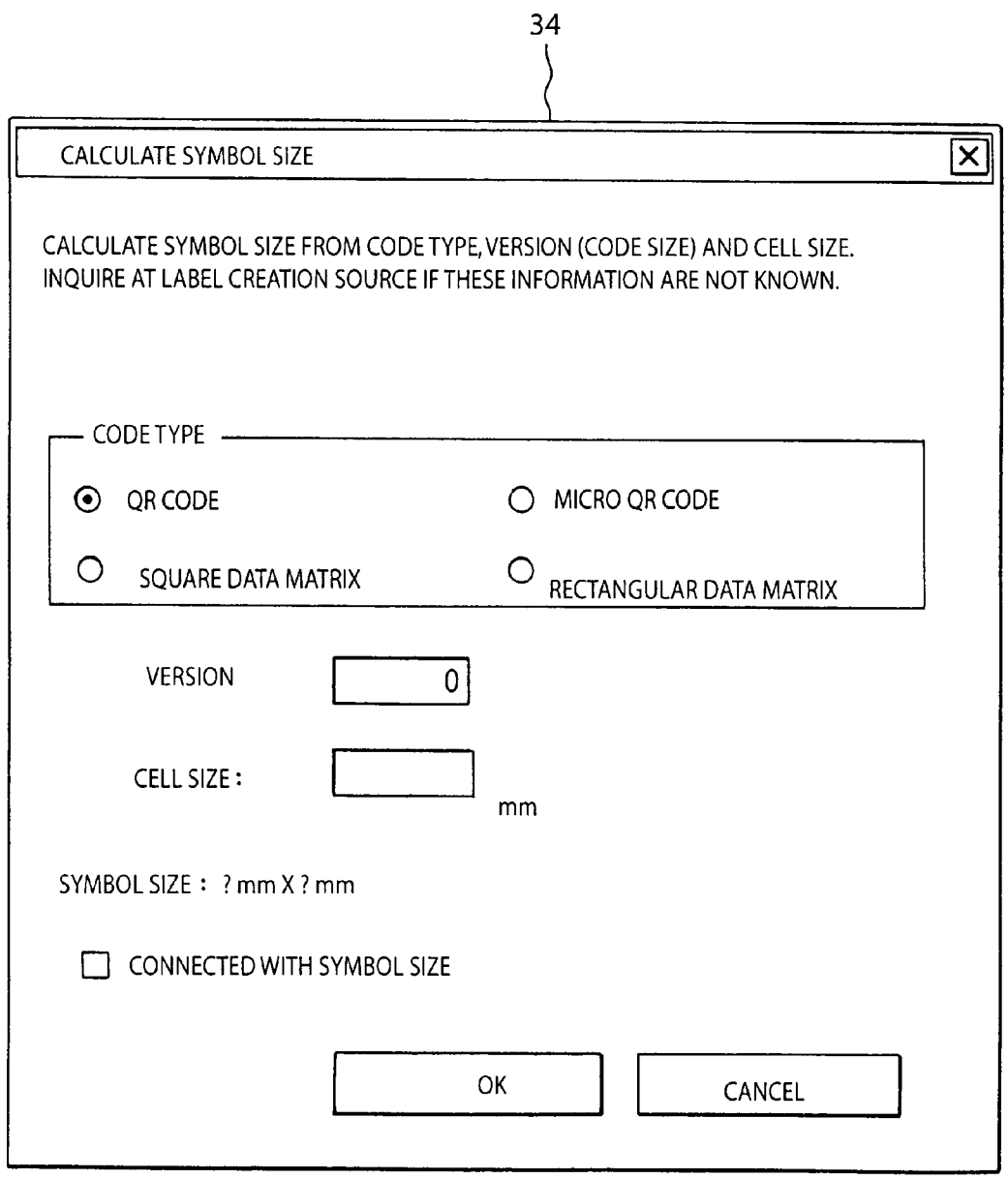
FIG. 8 is an image diagram showing a calculation set screen having the symbol size in the setting of the camera attachment conditions.

In this case, furthermore, the symbol size can also be calculated based on the two-dimensional code specification. When a "symbol size calculation" button 33 provided on the right side of a "symbol size" input column 32 in FIG. 7 is pressed down, a "symbol size calculation" set screen 34 is displayed on another window as shown in FIG. 8. From the screen, whether a connection with a code type, a version (a code size), a cell size, and a symbol size is carried out, is specified and an "OK" button is pressed down so that the symbol size is calculated based on these information and the result of the calculation is inputted to the "symbol size" input column 32 in FIG. 7. This processing flow is as follows.

(1) When the "symbol size calculation button" 33 in the set screen for determining the camera attachment condition in FIG. 7 is pressed down, the "symbol size calculation" set screen 34 shown in FIG. 8 is displayed.

(2) The symbol size is calculated from the code type, the version (code size), and cell size.

(3) The symbol size calculated as described above is displayed as the "symbol size".

(4) When the "OK" button is pressed down in FIG. 8, the "symbol size calculation" set screen 34 is closed to return to the screen of FIG. 7. At this time, the cell size and the symbol size which are obtained as described above are reflected by the "two-dimensional code specification" 27.

(5) In the case where the "connection of symbol size with cell size" column in FIG. 8 is being checked, the "symbol size" input column 32 is subjected to gray-out in the screen of FIG. 7 and the slider 31 is thus made valid.

As described above, in the embodiment according to the present invention, the user can directly specify the items such as the cell size and the symbol size of the two-dimensional code, and furthermore, the user can select a necessary specification and the device side can carry out the calculation. Even a user who does not know much about the two-dimensional code can carry out the setting. Moreover, a user who knows much about the two-dimensional code can also carry out the direct input. Consequently, the complexity for a knowledgeable user can be eliminated and any user can maintain the advantage of usability.

The two-dimensional code label shift tolerance 28 in FIGS. 6 and 7 indicates the shift range of a label or the positioning precision of a work and specifies an allowable range even if the label is shifted from a reference position. Furthermore, whether the rotation of the work is permitted is designated and "rotation" is checked when the work is rotated. When the "rotation" is checked, the two-dimensional code displayed on an attachment image screen in FIG. 10 which will be described below is rotated and is displayed obliquely and the selection of the "rotation" can also be confirmed with an image.

Furthermore, the printing pattern 29 selects normal or dot.

The desired attachment distance 30 is set in the case where the attachment distance of the camera is restricted, for example, a distance at which the camera can be separated physically under the use conditions of the two-dimensional code is limited.

Conditions other than the above-mentioned conditions which can be set include a depth field, an illuminating condition, a decoding time and the like.

When the above-mentioned conditions are inputted and the "calculation start" button 35 is pressed down, the camera attachment distance, the thickness of a close-up ring to be used, and the thickness of a focusing ring are calculated based on the designated conditions and are displayed on the "attachment specification" display column 36. Moreover, an "attachment condition detail" button 37 can be selected from the gray-out. In the case where the camera attachment distance cannot be calculated on the specified conditions in the same manner as in step S1, the purport, the reason, and the recommended value are presented and the user is urged to carry out input again.

Calculation of Camera Attachment Distance

Description will be given to an example of the operation algorithm of the camera attachment distance which is to be executed when the "calculation start" button 35 is pressed down. In the algorithm, a minimum value $O_{min}$ and a maximum value $O_{max}$ of the camera attachment distance are obtained in the following manner.

Calculation of Minimum Value $O_{min}$ of Camera Attachment Distance

The minimum value $O_{min}$ of the camera attachment distance to be the closest distance to be attached to the camera is calculated in the following manner.

(1) In the case where the code size of a two-dimensional code is unknown, the code size is calculated from the cell size and the symbol size. In the case of a square code, (symbol size)/(cell size)=code size is set.

(2) If the code size obtained as a result of the calculation is more than the theoretical maximum code size described above, the calculation is decided to be NG.

(3) Based on the symbol size, the shift range of a label and the presence of the rotation of a work, a necessary visual field $Vy_{min}$ in a Y-direction is calculated. For example, when the rotation is permitted in the square code, a necessary visual field of $Vy_{min}$=(one side of printing space)×$\sqrt{2}$+2×(positioning precision) is set.

(4) A magnification $M_{max}$ for maintaining $Vy_{min}$ is obtained. The magnification $M_{max}$ is calculated with $M_{max}$=s×n/$Vy_{min}$, wherein s represents the pixel size of a CCD, n represents a y-direction pixel number×safety coefficient of the CCD and m represents an allocated pixel (5 or 8).

(5) A combination of a close-up ring to satisfy $M_{max}$ is picked up. An effective close-up ring thickness f·M is calculated with f·M=(close-up ring thickness)+(focusing ring adjustment range). When there is no combination to satisfy $M_{max}$, $M_{max}$ is determined again from the combination of the close-up ring which can be realized.

(6) A distance $O_{min}$ from an object in $M_{max}$ obtained in preceding step (5) above to the front end of the lens and a visual field Vy in that case are calculated. The distance $O_{min}$ to the front end of the lens is calculated with $O_{min}$=f/M+2f+ΔH−d, wherein ΔH represents a distance between the principal points of the lens and d represents a lens length. Moreover, the visual field Vy is calculated with Vy=s×n/M, wherein s represents the pixel size (mm) of a CCD, n represents (y-direction pixel number of CCD)×(safety coefficient), and M represents a magnification. In the present embodiment, a focal length f=24.97 [mm], a distance between principal points ΔH=0.69 [mm], a lens length (from a lower end to a focal plane) d=54.83 [mm], a CCD pixel size s=0.0074 [mm], a CCD y-direction pixel number=480, a CCD x-direction pixel number=640, a focusing ring adjustment range=0 to 2.5 [mm], and a visual field safety coefficient=0.9 are set to be calculation parameters.

Calculation of Maximum Value $O_{max}$ of Camera Attachment Distance

The maximum value $O_{max}$ of the camera attachment distance to be the longest distance at which the camera is attached is calculated in the following manner.

(1) A magnification $M_{min}$ at which one cell of a two-dimensional symbol has five pixels (in the case of a normal pattern) or eight pixels (in the case of a dot pattern) is obtained. $M_{min}$=S×m/S is calculated, wherein s represents the pixel size (mm) of a CCD, m represents an allocated pixel (5 or 8) and S represents a cell size (mm) on a work.

(2) A combination of a close-up ring to satisfy $M_{min}$ is extracted. If there is no combination to satisfy $M_{min}$, then $M_{min}$ is determined again from the combination of the close-up ring which can be realized.

(3) A distance $O_{max}$ from an object in $M_{min}$ obtained in preceding step (2) above to the front end of the lens and a visual field Vy in that case are calculated.

Display of "Attachment Specification" Display Column 36

"Height for two-dimensional code to be 70% of visual field" is displayed on the result of the calculation displayed in the "attachment specification" display column 36 in the set screen for determining the camera attachment conditions in FIG. 7. This corresponds to the case where a safety coefficient is set to be 0.7 in the equation for obtaining the minimum value $O_{min}$. In the case where the number of allocated pixels is less than 5, there is displayed a height ($O_{max}$) at which one cell of the two-dimensional code has five pixels (normal pattern) or eight pixels (dot pattern) on the CCD.

Attachment Condition Detail

Figure 9:
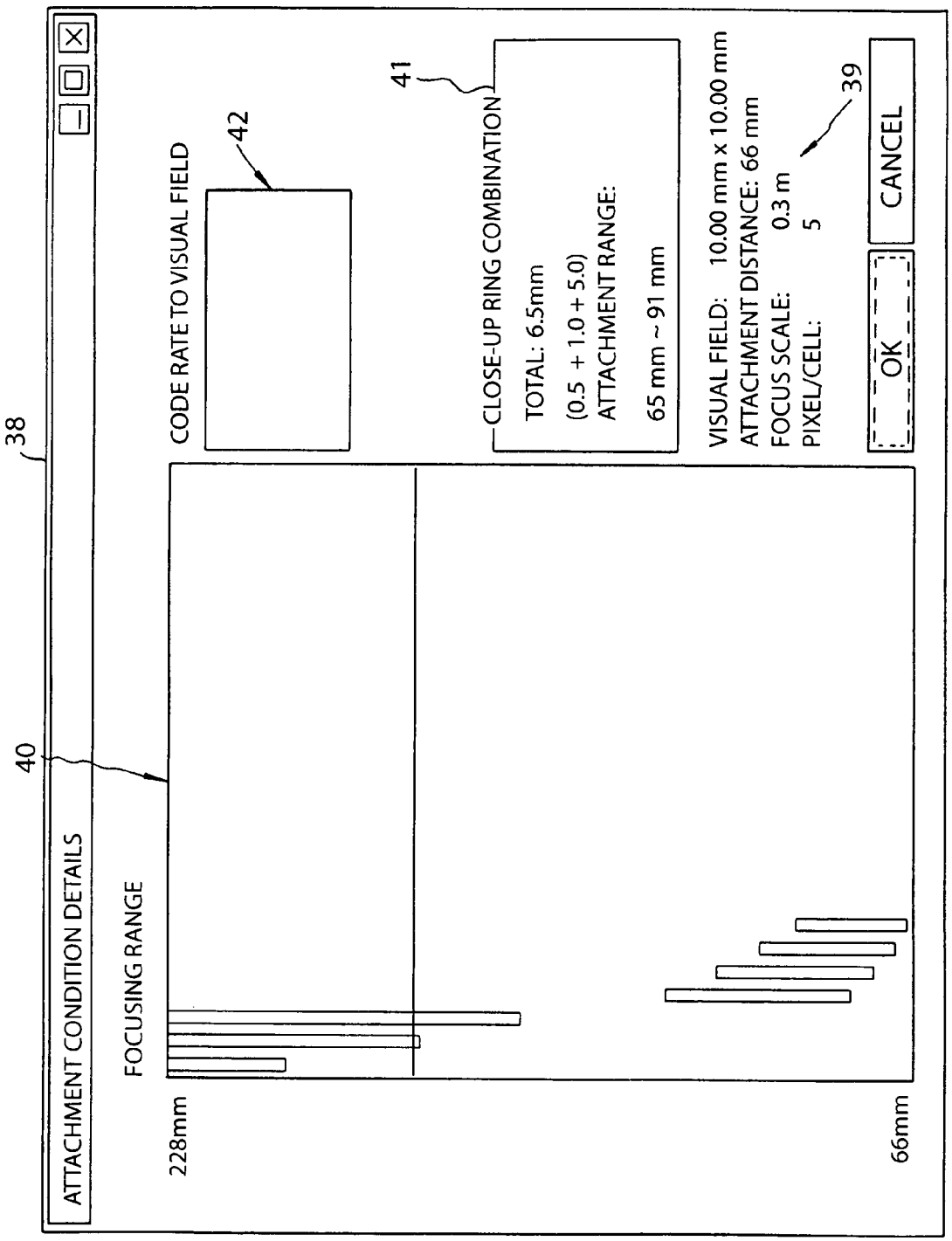
FIG. 9 is an image diagram showing the details of the camera attachment conditions in the setting of the camera attachment conditions.

The camera attachment distance indicates a minimum value or a recommended value. In the case of the minimum value, actual attachment may have a greater value. The recommended value is 1.1 to 2.0 times as great as the minimum value. When the "attachment condition detail" button 37 is pressed down in FIGS. 6 and 7, the camera attachment condition detail screen 38 in FIG. 9 is displayed. In FIG. 9, a distance at which the camera can be attached is shown. In the drawing, by setting the attachment distance of the camera which is calculated to be a minimum value, a range in which the attachment can be carried out is shown and a region shown in a bar graph indicates a range in which focusing can be carried out. Moreover, the pattern of the combination of the close-up ring which can be obtained is illustrated. In addition to the camera attachment distance and the thickness of the close-up ring, furthermore, the limited value of a reading cell size is calculated. In the cases of the normal pattern and the dot pattern, respective operation values are displayed on the attachment condition detail display column 39.

In FIG. 9, the left side indicates a "focusing point range" display column 40, an axis of ordinate indicates the camera attachment distance and a range in which focusing can be carried out is shown in a bar graph. In FIG. 9, seven bars are shown and each bar represents the combination of the close-up rings. When each bar is clicked and selected, the color of the bar is changed to be red, for example, and the details of the combination of the close-up rings thus selected are displayed in a "close-up ring combination" column 41 on the right side. In the drawing, "total: 6.5 mm" in the "close-up ring combination" column 41 indicates that the total ring thickness in the combination of the close-up rings which is currently selected is 6.5 mm. Moreover, "(0.5+1.0+5.0)" indicates that 6.5 mm is obtained by superposing close-up rings having thicknesses of 0.5 mm, 1.0 mm, and 5.0 mm as the pattern of the combination of the close-up rings. Consequently, the user preferably prepares close-up rings having specified thicknesses and can select the combination of the close-up rings without a hesitation. Furthermore, "attachment range: 65 mm to 91 mm" indicates that focusing can be carried out within a range of 65 mm to 91 mm in the combination of the close-up rings which is currently selected. This range corresponds to the length of the bar in the "focusing point range" display column 40. In the "focusing point range" display column 40, the upper and lower ends of a part of the bar are partially cut, which is displayed based on whether or not each bar can carry out focusing. On the other hand, in consideration of the basis as to whether or not the whole two-dimensional code can be read, regions on the upper and lower ends are not included. More specifically, the determination is carried out depending on whether a cell on the upper end of the bar can be discriminated, and the lower end is determined depending on whether the whole two-dimensional code can be read. The above-mentioned items depend on the combination of the close-up rings. Therefore, when another bar is selected in the "focusing point range" display column 40, a newly selected bar is indicated to have a red color, for example, and the display of the "close-up ring combination" column 41 and the attachment condition detail display column 39 are updated to information corresponding to the same bar.

Moreover, "visual field: 10 mm×10 mm" of the attachment condition detail display column 39 represents a current visual field. When a mouse is clicked in an optional position in the "focusing point range" display column 40, a visual field in the checked position, that is, a visual field in which a position corresponding to an axis of ordinate of the "focusing point range" display column 40 is set to be an attachment distance is calculated and displayed. Thus, the size of the visual field depends on the attachment distance.

Furthermore, the "attachment distance: 66 mm" represents a distance from a reading object to the front end of the lens. Moreover, when the mouse is clicked in the "focusing point range" display column 40, a distance corresponding to the axis of ordinate of the "focusing point range" display column 40 is displayed in the clicked position.

Moreover, "focus scale: 0.3 m" implies that focusing is carried out if the scale of a focusing ring attached to the lens is adapted to 0.3 m. Referring to this item, when the mouse is clicked in the "focusing point range" display column 40, a value corresponding to the clicked position is calculated and displayed. In the present embodiment, a lens for focusing in a range of 0.3 m to infinity (∞) is used. Therefore, the value to be displayed in this item ranges from 0.3 m to ∞. This item depends on the combination of the close-up rings and the attachment distance.

Furthermore, "pixel/cell: 5" implies that one cell of a two-dimensional code is allocated to five pixels of a CCD at a current set attachment distance. Referring to this item, similarly, when the mouse is clicked in the "focusing point range" display column 40, a value corresponding to the clicked position is calculated and displayed. When the mouse is clicked in the vicinity of the lower part of the "focusing point range" display column 40, the value is increased. To the contrary, when the mouse is clicked on the upper part of the "focusing point range" display column 40, the value is decreased. This item also depends on the attachment distance.

The operation of each parameter displayed in the attachment condition detail display column 39 described above can be carried out in the following manner.

Visual Field (1) A magnification M is calculated based on an attachment distance O. The magnification M is calculated with $M=-f/(2f+\Delta H-d-O)$, wherein f represents a focal length, $\Delta H$ represents a distance between principal points of the lens, and d represents a lens length.

(2) Visual fields Vx and Vy are calculated from the magnification M. The visual field Vx is calculated with $Vx=s\times n/M$, wherein s represents a pixel size (mm) of the CCD, n represents an x-direction pixel number of the CCD and M represents a magnification. Moreover, the visual field Vy is calculated with $Vy=s\times n/M$, wherein s represents a pixel size (mm) of the CCD, n represents a y-direction pixel number of the CCD and M represents a magnification.

Focusing Scale (1) An effective close-up ring thickness f·M is obtained based on the magnification M.

(2) A length lpint for covering with a focusing ring is obtained from the effective close-up ring thickness f·M and an thickness lring of a close-up ring to be used actually. lpint=f·M−lring is set.

(3) A value p of the focusing scale is obtained from lpint. The focusing scale is displayed on a 0.1 m unit and is represented by ∞ if it is greater than 5 m. The value p of the focusing scale is calculated with $p=f^2/lpint+2f+\Delta H+lpint$.

Allocated Pixel (pixel/cell)

(1) An allocated pixel number m is obtained based on a magnification M, a pixel size s of a CCD and a cell size S on a work. The value thus obtained is displayed in an integer value with the figures below the decimal place omitted. The pixel number m is calculated with $m=M\times S/s$, wherein s represents a pixel size (mm) of a CCD and S represents a cell size (mm) on a work.

Furthermore, it is also possible to display a two-dimensional code using any region of the whole visual field as a "ratio of code to visual field" column 42. For the standard, it is preferable that the whole two-dimensional code should be displayed in one-third or more of a region in the vicinity of the center of the visual field. The user carries out setting such that the whole two-dimensional code is held in the visual field and can be displayed as largely as possible by referring to the ratio of the code to the visual field. As described above, the present program automatically calculates and displays the conditions, that is, a camera attachment height, a close-ring thickness and a focusing ring scaling in place of the user.

Attachment Image

Figure 10:
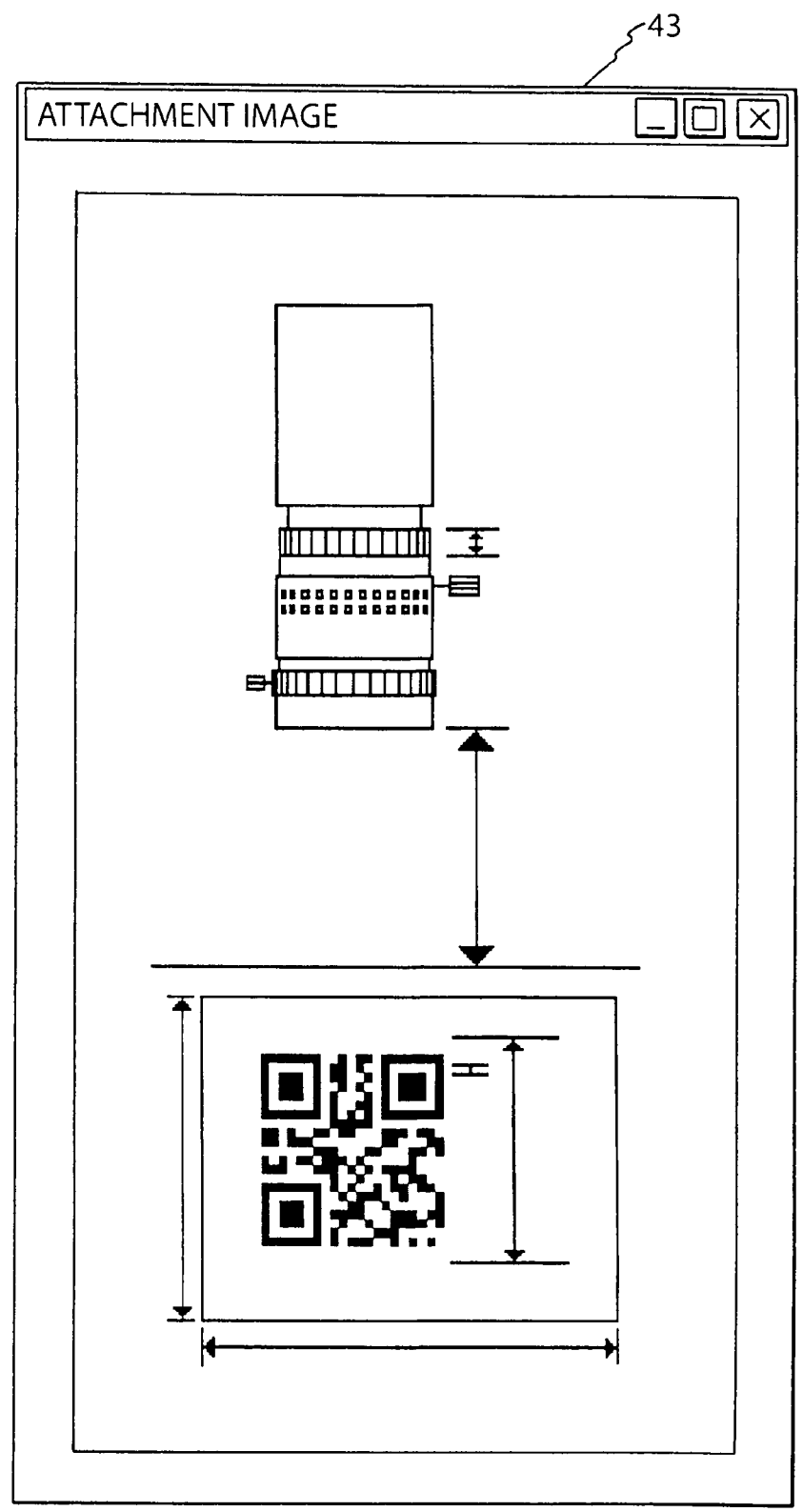
FIG. 10 is an image diagram showing an attachment image in the setting of the camera attachment conditions.

At step S2, moreover, an attachment image 43 can also be displayed as shown in FIG. 10. Consequently, any portion of the two-dimensional code reading operation device to which each value thus calculated corresponds can be displayed to be easily understood by the user. By visually displaying a portion to be regulated for a user who is unfamiliar with two-dimensional code setting, particularly, the setting can easily be carried out. Examples of the items which can be subjected to image display include a camera attachment distance related to an operation, a close-up ring type, a focusing ring scale standard, the length and width of a two-dimensional code symbol, a cell size, the length and width of a two-dimensional code label having a two-dimensional code printed thereon, and the relationship between work positioning precision or a visual field and a symbol size, and can be displayed wholly or partially or only a selected portion can also be displayed. Moreover, a numeric value which is inputted to each portion or is calculated may be noted or each portion to be displayed may have a color varied. Furthermore, the attachment image 43 in FIG. 10 is displayed side by side with the set screen of FIGS. 6 and 7, and portions in FIG. 10 which correspond to the set items and the results of an operation in FIGS. 6 and 7 can also be displayed in the same colors. Furthermore, it is also possible to utilize a method of displaying the item selected in FIGS. 6 and 7 with a highlight of inversion, flashing, a thick character, a red character or the like in FIG. 10 and, to the contrary, a method of displaying an item or a numeric value corresponding to the portion selected in FIG. 10 with a highlight in FIGS. 6 and 7. Alternatively, it is also possible to change a size to be subjected to image display corresponding to the calculated size or to correspondingly vary the sample of a two-dimensional code subjected to the image display with a change in the type of the two-dimensional code which is selected. Furthermore, it is also possible to add a guidance function of displaying an attaching method in a dynamic image, interpreting each portion in a voice or explaining an attaching method. By such image display, it is possible to aid in easy setting by a beginner.

Step S3 Two-dimensional Code Reading Operation Setting

FIGS. 11 to 16 show a screen image for setting the operation of a two-dimensional code reader body. In this screen, reading code setting, reading operation setting, output setting, setting about predictive maintenance information, communication setting and other settings are switched for each tab. Each of them will be described below. A hardware operation of the two-dimensional code reader itself is set and the setting is carried out separately from a setting adapted to the use conditions in steps S1 and S2. Accordingly, although step S3 is set for convenience of the explanation, the setting can originally be carried out independently of steps S1 and S2 as described above. The setting is not always carried out after steps S1 and S2 but can be carried out before them or during them.

Figure 11:
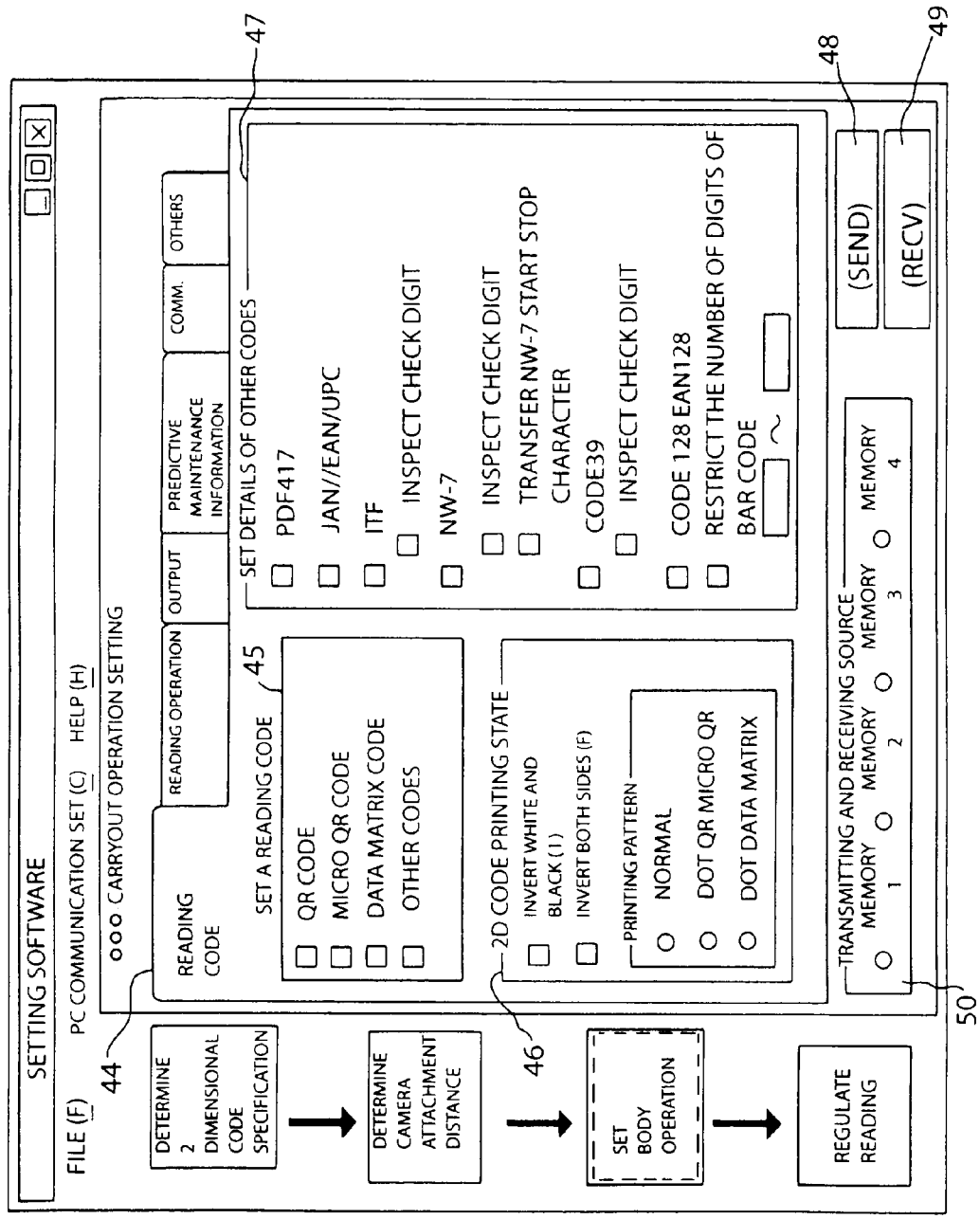
FIG. 11 is an image diagram showing the set screen of a read code in the operation setting of the two-dimensional code reader.

In the screen of FIG. 11, a "reading code" 44 is set. First of all, a type of a two-dimensional code to be read as a reading code is selected in a "reading code set" column 45. The type of the two-dimensional code which can be selected corresponding to the specification of the two-dimensional code reader is listed, and the user can select a plurality of desirable types. A throughput, a speed and the like depend on the specification of the two-dimensional code reader. In general, if a large number of kinds of two-dimensional codes are set, a long time is taken for reading. In order to shorten a reading time, a reading code for reading by removing the check of an unnecessary two-dimensional code is restricted.

According to the type of the two-dimensional code thus selected, the details can further be set. For example, when a QR code is selected, the detail set screen of the QR code can be displayed in another window, the upper and lower limits of a version number of the QR code to be read can be specified and restricted and whether the edition mode of a coupling code can be brought can be set. Alternatively, when a data matrix is selected, the cell number and the visual field can be restricted. In the case where the cell number is restricted, the upper and lower limits of the cell number are specified. In the case where the visual field is restricted, upper left and lower right coordinates are specified as (1, 1) and (640, 480) as the vertex coordinates of the visual field, for example.

Furthermore, white and black inversion and double-side inversion can be specified as a "two-dimensional code printing state" specifying column 46, and furthermore, normal, dot and the like can be selected as a printing pattern. Moreover, when "other codes" is selected and is checked in the "reading code set" column 45, an "other code detail set" column 47 on the right side can be inputted from gray-out and each item can be set. By the setting, various kinds of two-dimensional codes and bar codes can be set to be reading objects.

Moreover, the set contents can be transmitted and received in FIGS. 11 to 16. A transmitting destination includes memories 1 to 4 provided in the two-dimensional code reading operation body and each of them can hold separate data. When a transmitting and receiving destination 50 is selected in each screen and a "set transmission" button 48 is pressed down, the set contents are transmitted to a specified destination. When a "set receipt" button 49 is pressed down, furthermore, the set contents are fetched from the specified destination.

Figure 12:
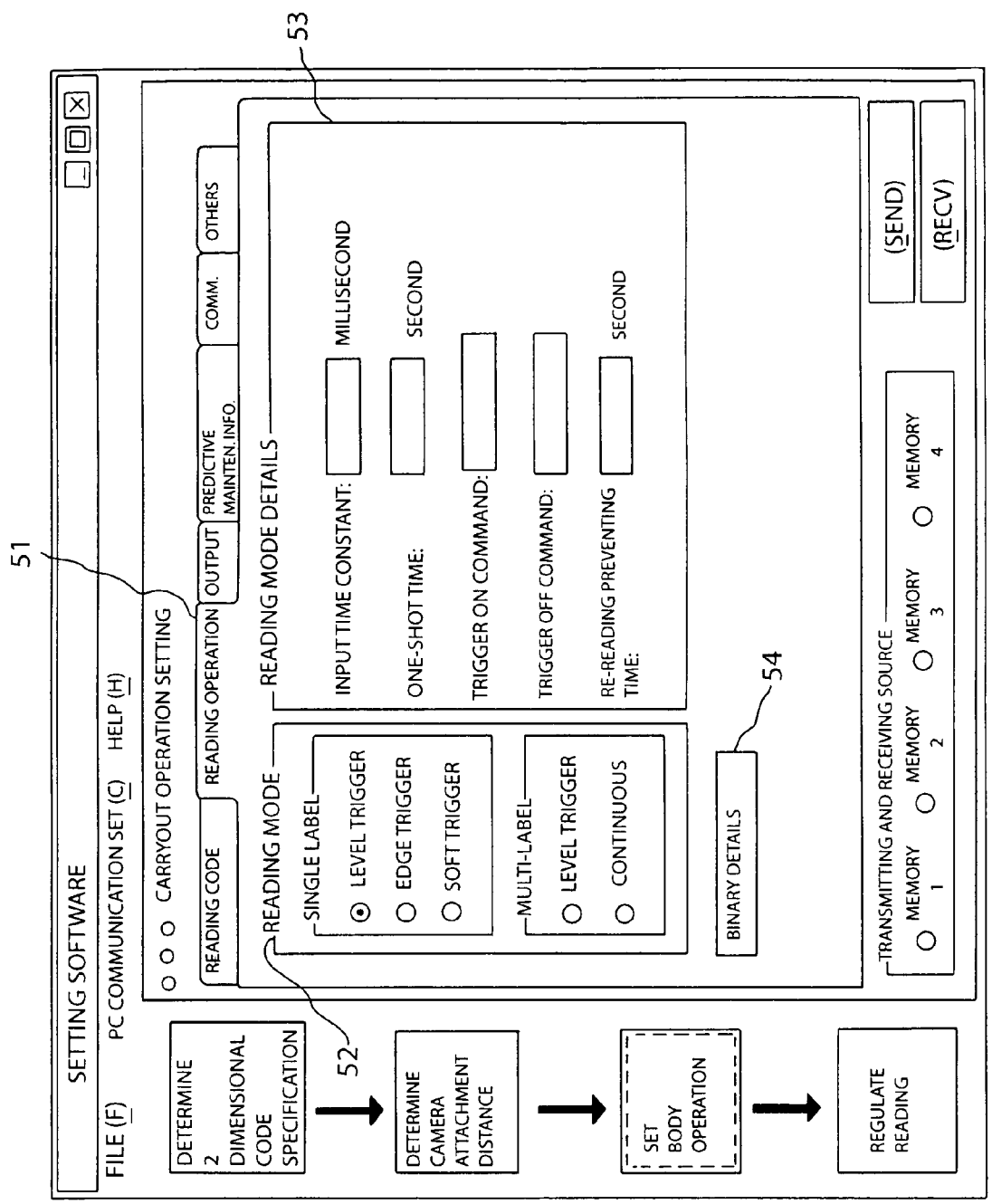
FIG. 12 is an image diagram showing the set screen of a reading operation in the operation setting of the two-dimensional code reader.
Figure 23:
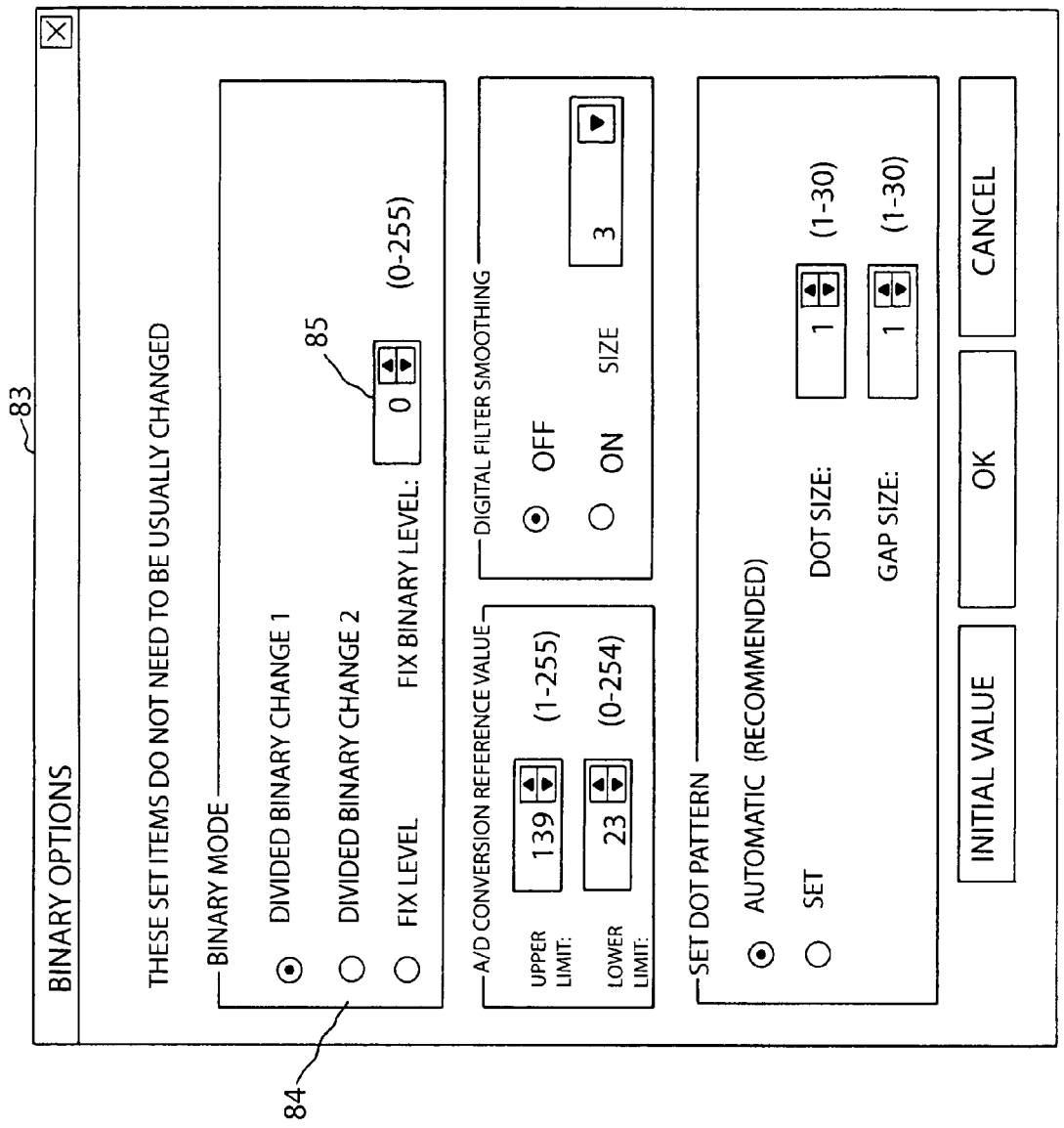
FIG. 23 is an image diagram showing a binary option screen in the operation setting of the two-dimensional code reader.

In FIG. 12, a reading operation is set through a "reading operation" tab 51. In a "reading mode" set column 52, any of level trigger, edge trigger, and soft trigger is selected for a single label and level trigger or "continuous" is selected for a multi-label. Moreover, "input time constant", "one-shot time", "trigger ON command", "trigger OFF command" and "re-reading prevention time" are specified as a "reading mode detail" 53 if necessary. Furthermore, when a "binary detail" button 54 is pressed down, a "binary option" screen 83 shown in FIG. 23 is opened in another window and a binary method, an A/D conversion reference value, a digital smoothing size, dot pattern setting and the like can be set. In a normal operation, such setting does not need to be changed.

Figure 13:
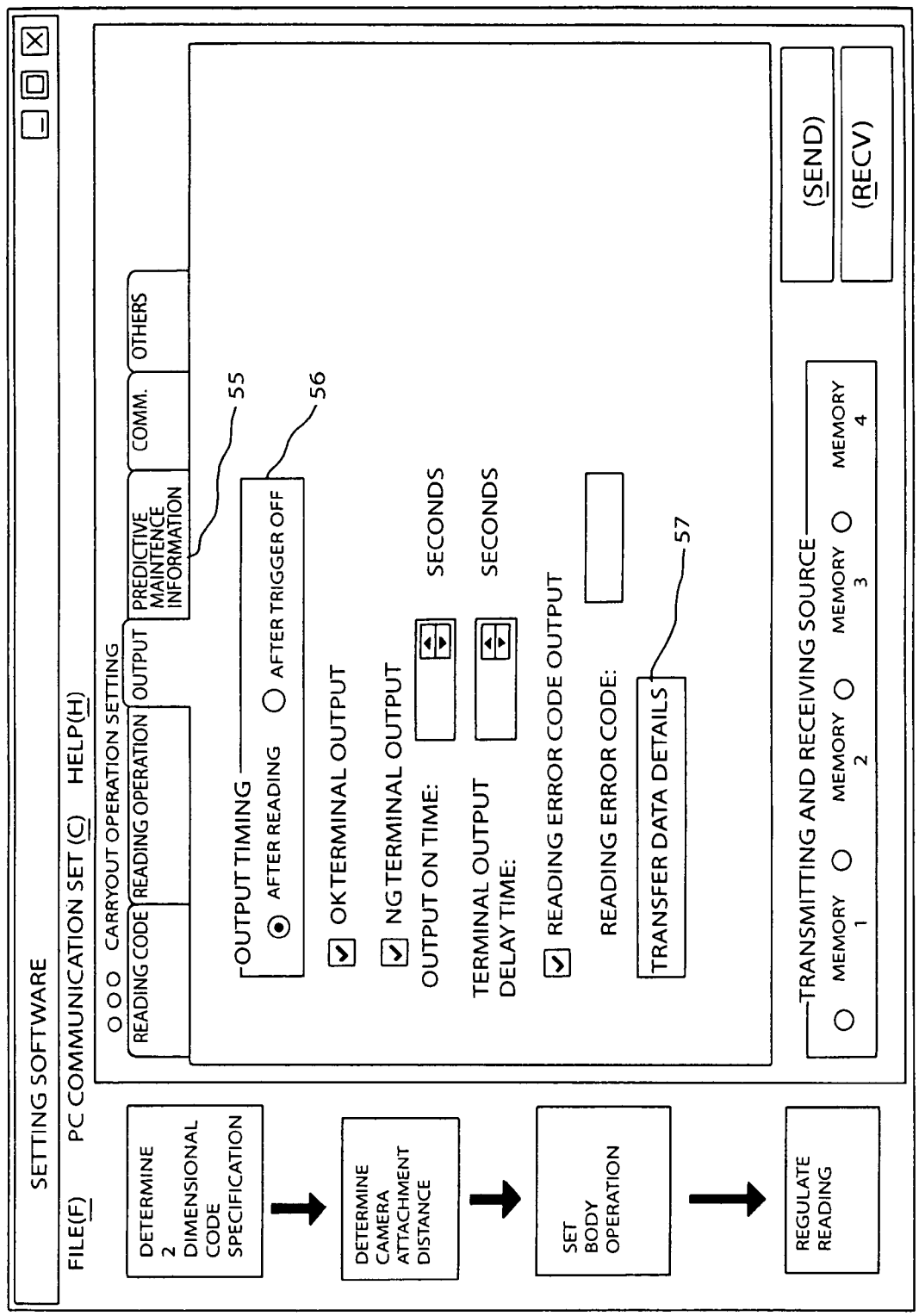
FIG. 13 is an image diagram showing the set screen of an output in the operation setting of the two-dimensional code reader.

In an "output" tab 55 of FIG. 13, output setting is carried out. Reading is carried out as an "output timing" 56 and any is then selected after trigger OFF, and furthermore, the presence of an OK terminal output, an NG terminal output and a reading error code output is set. Moreover, when a "transfer data detail" button 57 is pressed down, a "transfer data detail" set screen is opened in another window and the presence of "symbol identifier transfer", "digit number transfer", "break character transfer" and "BCC transfer" is selected by the ON/OFF operation of a check box, respectively.

Figure 14:
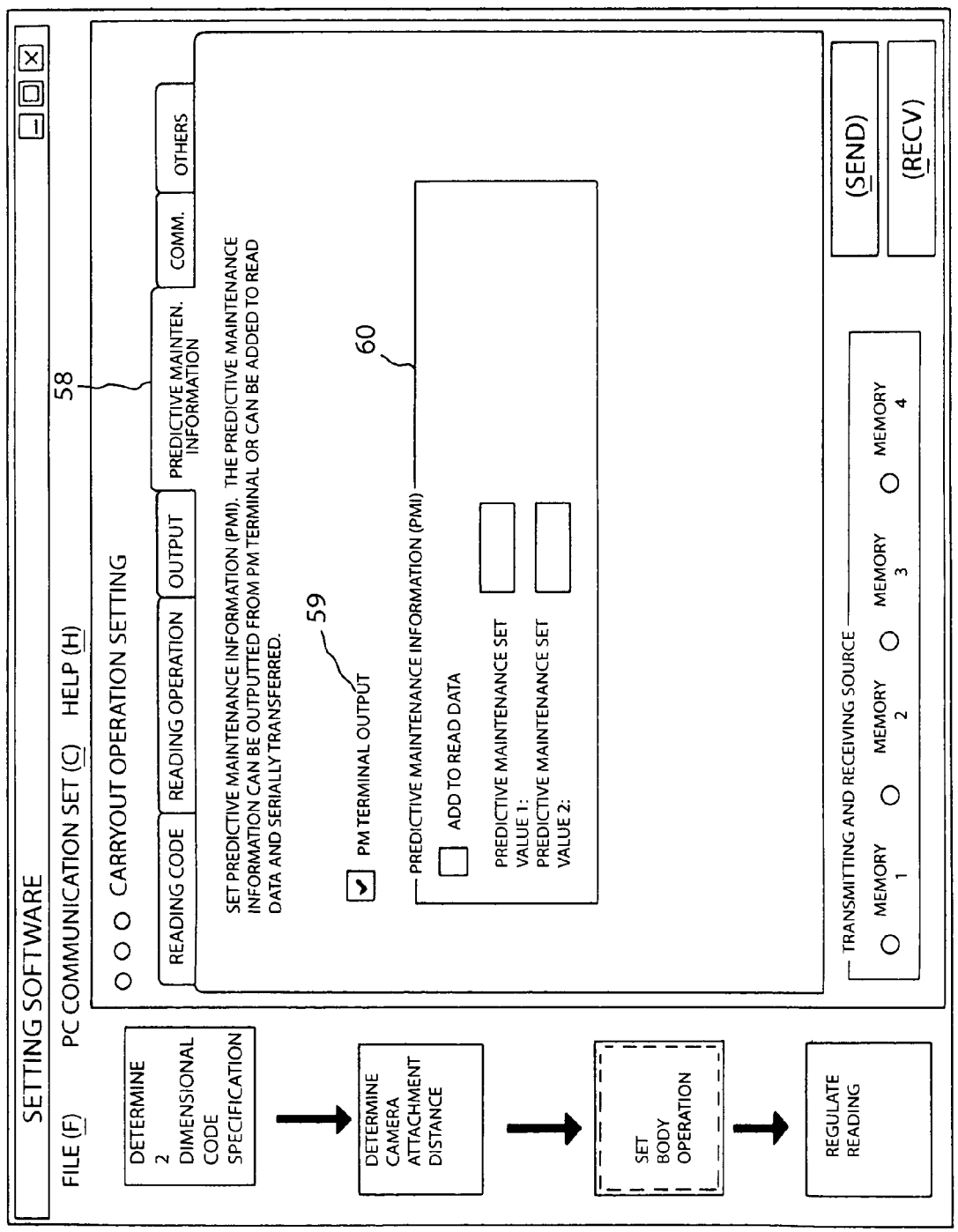
FIG. 14 is an image diagram showing the set screen of predictive maintenance information in the operation setting of the two-dimensional code reader.

In a "predictive maintenance information" tab 58 in FIG. 14, predictive maintenance information is set. The predictive maintenance information (PMI) indicates a reading stability to be an index indicative of the reading stability of a two-dimensional code, and each contrast is checked in a region constituting a light and darkness of a two-dimensional code and is compared with a predetermined stability threshold, thereby deciding whether or not reading is stably carried out. In the example of FIG. 14, whether the predictive maintenance information is outputted from a PMI terminal, is set in a "PMI terminal output" column 59. The PMI terminal is a special I/O terminal for outputting the predictive maintenance information and corresponds to a reading stability output circuit 8.

In a "predictive maintenance information (PMI)" set column 60, moreover, it is set whether the predictive maintenance information is added to decoding data reading a two-dimensional code. If checking is carried out therein, the predictive maintenance information is added to decoded data and is transferred as serial data from the serial input/output section 13. Both an output from the PMI terminal and an output from the serial input/output section 13 can also be selected.

Furthermore, the "predictive maintenance information (PMI)" set column 60 inputs a predictive maintenance set value 1 to be an upper limit stability threshold and a predictive maintenance set value 2 to be a lower limit stability threshold. A user determines and inputs, for each predictive maintenance set value, a reference value to decide that a light and darkness contrast reading a two-dimensional code is deteriorated, and a reading stability is thus reduced according to the use environment. In this example, a two-dimensional code reading stability is evaluated in a three-stage evaluation using two stability thresholds.

Figure 15:
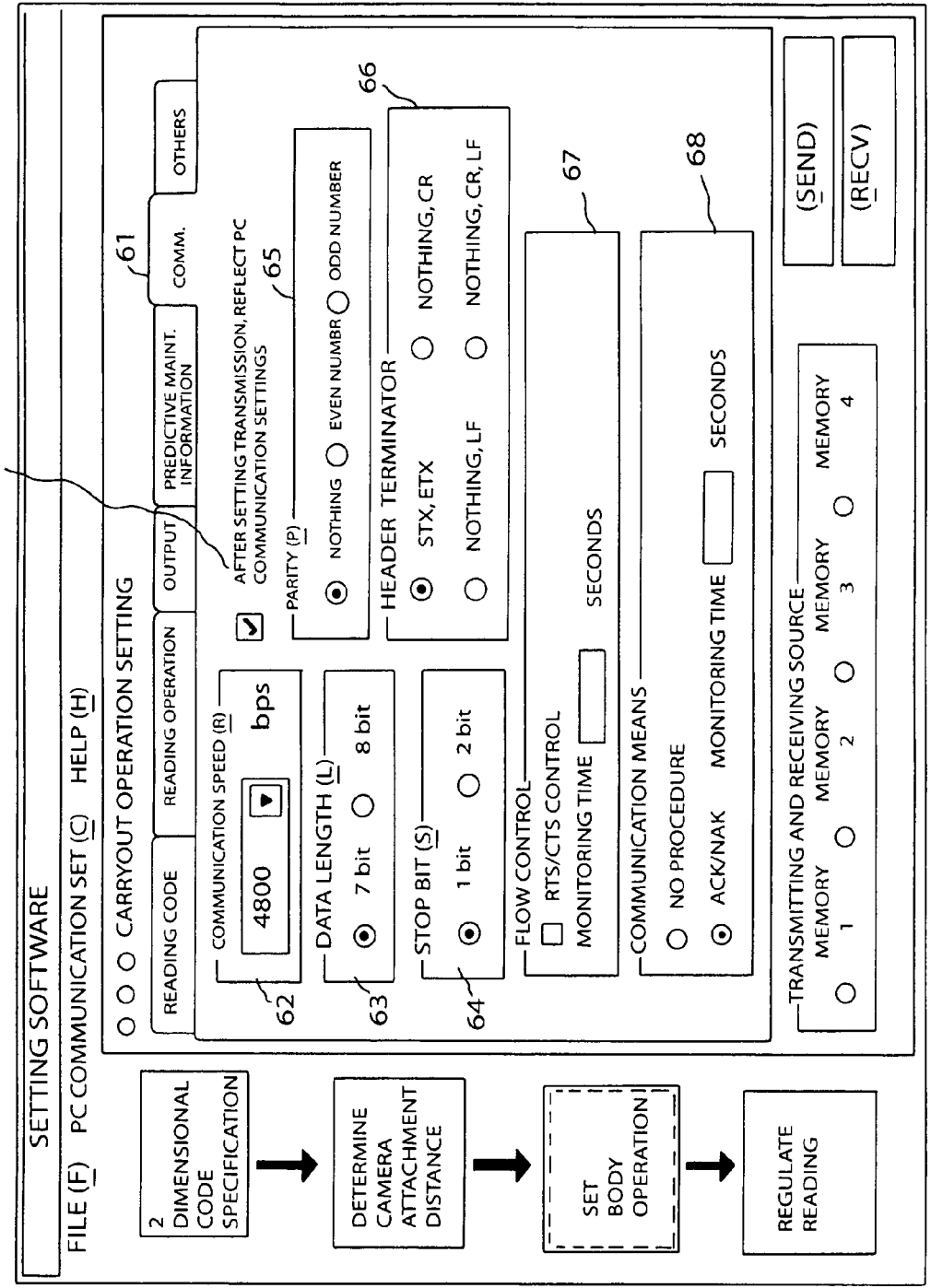
FIG. 15 is an image diagram showing the set screen of communication in the operation setting of the two-dimensional code reader.

A "communication" tab 61 in FIG. 15 is a screen image indicative of a communication set screen. Herein, the two-dimensional code reader sets the conditions for carrying out a communication with a host system. In this example, a serial communication is carried out by a computer constituting the host system and RS-232C. In FIG. 15, a "communication speed" 62 carries out selection from a combination box of 4800 bps, 9600 bps, 19200 bps, 38400 bps, 57600 bps, and 115200 bps. Moreover, a "data length" 63 selects a type, for example, seven bits or eight bits, a "stop bit" 64 selects a type, for example, one bit or two bits, a "parity" 65 selects a type, for example, nothing, an even number or an odd number, and a "header, terminator" 66 selects a type, for example, STX, ETX, CR, or LF. Furthermore, "flow control" 67 selects RTS/CTS control and "communication means" 68 selects no procedure, ACK/NAK or the like. When "reflect PC communication setting after setting is end" 69 is checked, moreover, the setting is caused to automatically reflect the PC communication setting. Consequently, even if the communication setting on the two-dimensional code reader side is changed, a communication with the host system can be carried out continuously.

Figure 16:
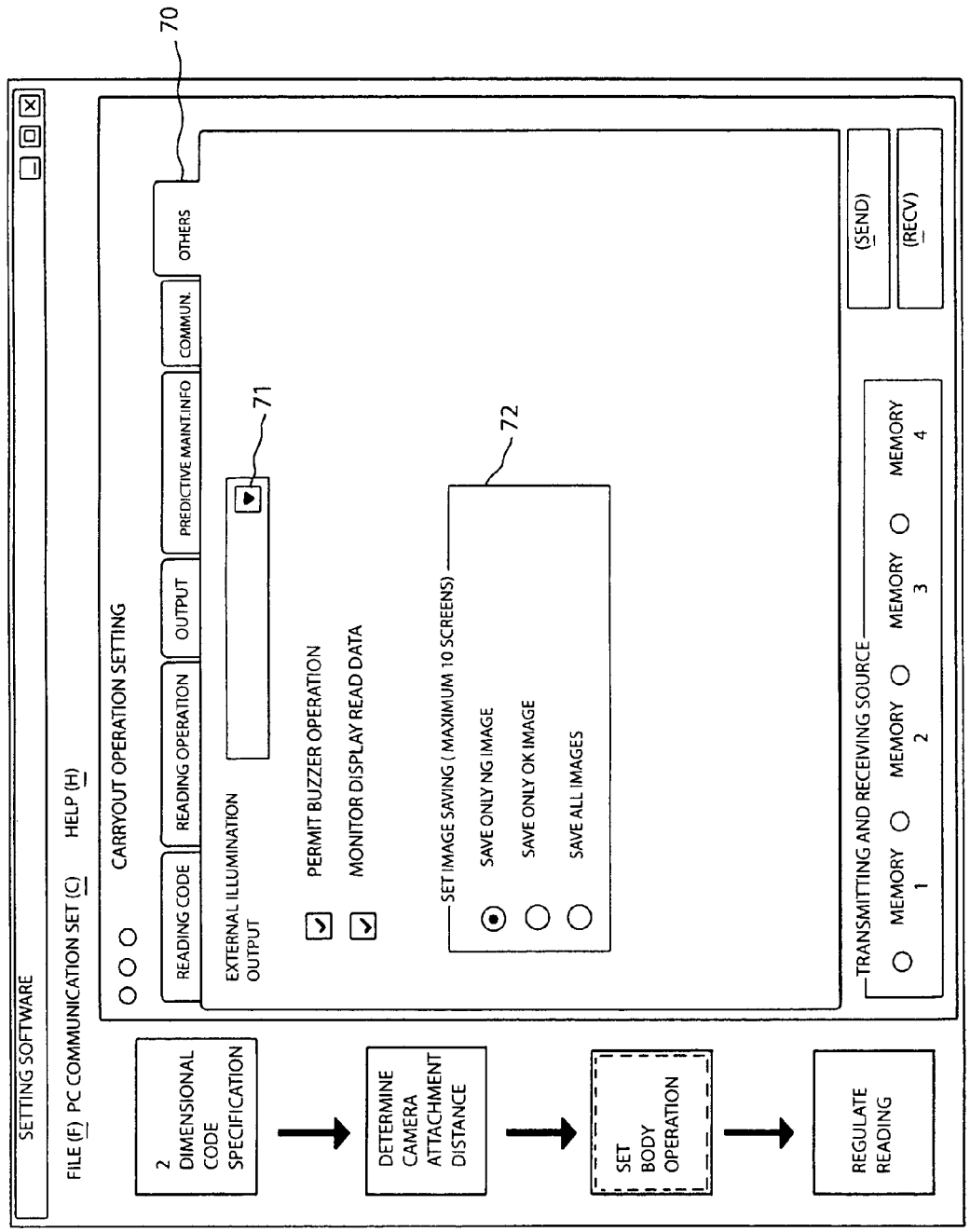
FIG. 16 is an image diagram showing another set screen in the operation setting of the two-dimensional code reader.

Furthermore, FIG. 16 shows another set screen by an "other" tab 70. As an "external illumination output" 71, any of "nothing", "always OFF", "always ON", "trigger synchronization ON," and "trigger synchronization OFF" is selected from the combination box. Moreover, "buzzer operation permission" and "read data display" are selected by a check box. Furthermore, acquired image data saving conditions are set as "image saving setting" 72. In this example, 10 screens can be saved at a maximum and any of only NG image saving, only OK image saving, and all image saving is selected.

Step S4 Reading Regulation

Figure 17:
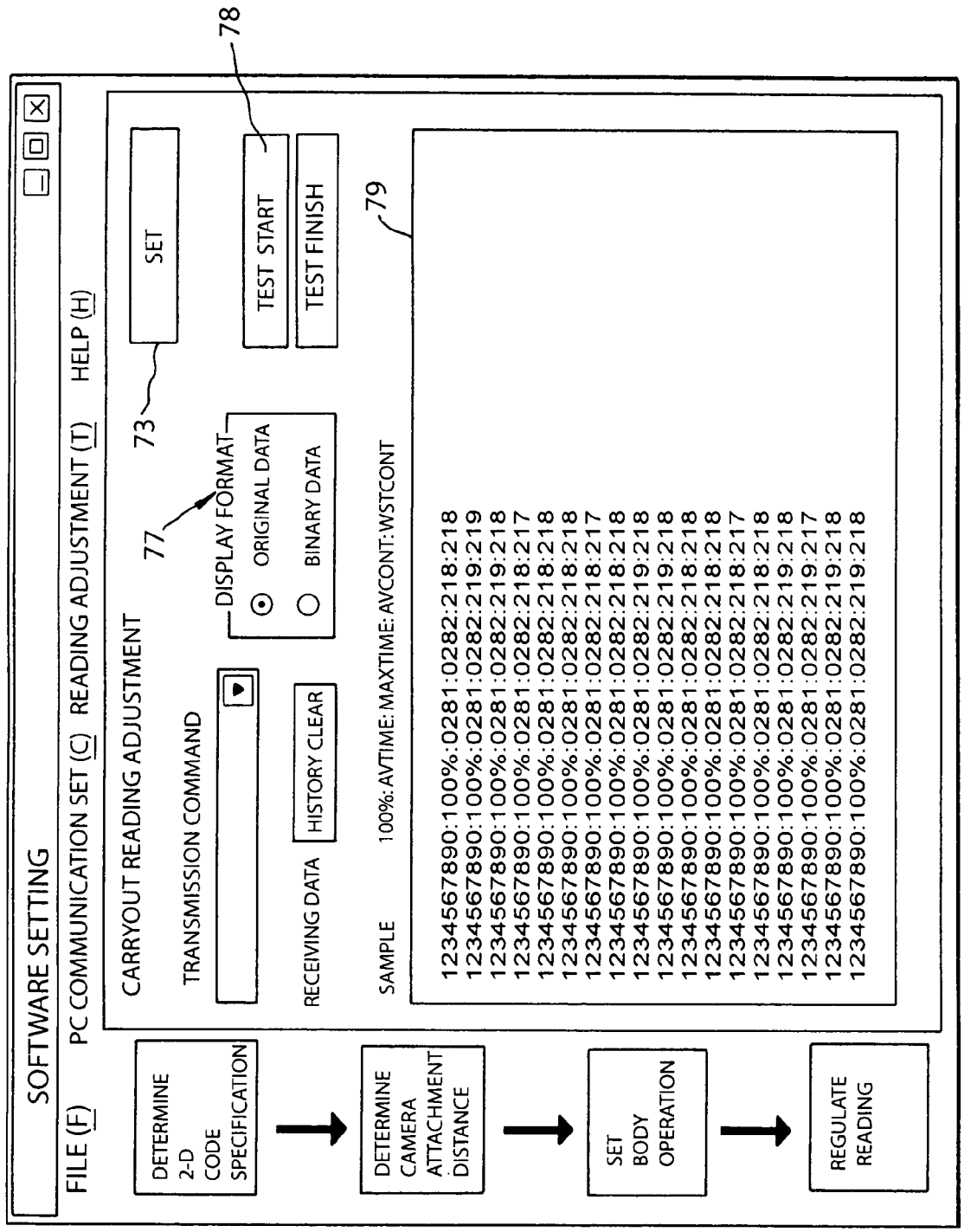
FIG. 17 is an image diagram showing an example in which a reading rate is high as a result of a reading test in a reading adjustment screen.
Figure 18:
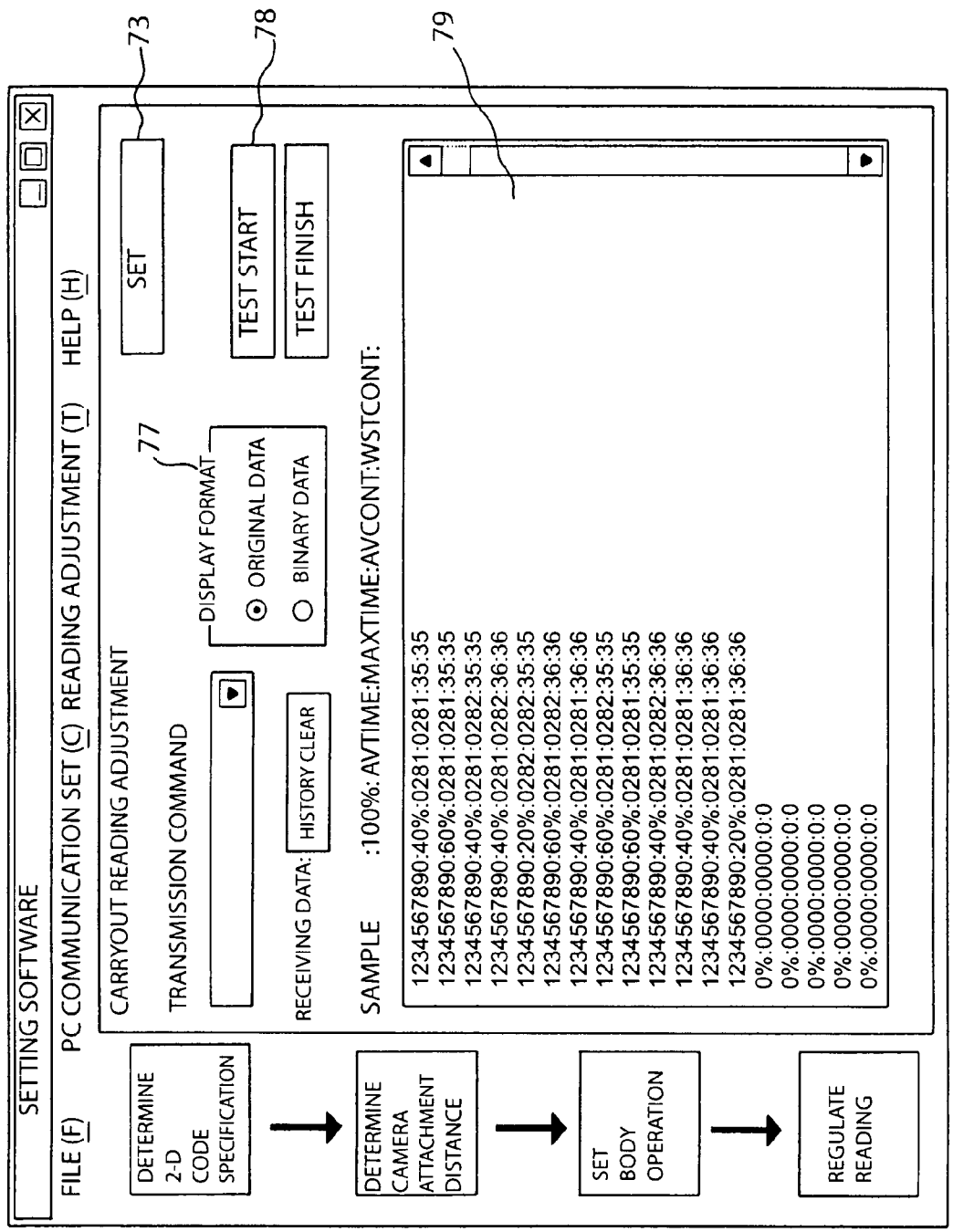
FIG. 18 is an image diagram showing an example in which the reading rate is low as a result of the reading test in the reading adjustment screen.

FIGS. 17 and 18 show a reading regulation screen. In the screen, an operation is actually carried out with a two-dimensional code label set onto the two-dimensional code reader so that a reading test can be carried out. Furthermore, an illuminance distribution test can also be executed before the two-dimensional code is set. Thus, the two-dimensional code reader includes a reading test mode for confirming a reading operation and an illuminance distribution confirmation mode for confirming an illuminance distribution state in the visual field of a camera. The two-dimensional code reader includes reading regulation means for executing the reading test mode and the illuminance distribution confirmation mode. The reading regulation means is implemented by an operation circuit shown in the block diagram of FIG. 1 and a "reading regulation button" on the lower left of the screen is selected to bring a reading regulation screen as shown in FIGS. 17 and 18. From this screen, these modes can be operated. First, the reading test mode will be described.

Reading Test Mode

In the reading test mode, the two-dimensional code reader actually carries out a reading operation continuously for a two-dimensional code label and displays a result of a test every predetermined trial number. Furthermore, this operation is repeated at a plurality of times and the result of the test is displayed in a list.

Figure 19:
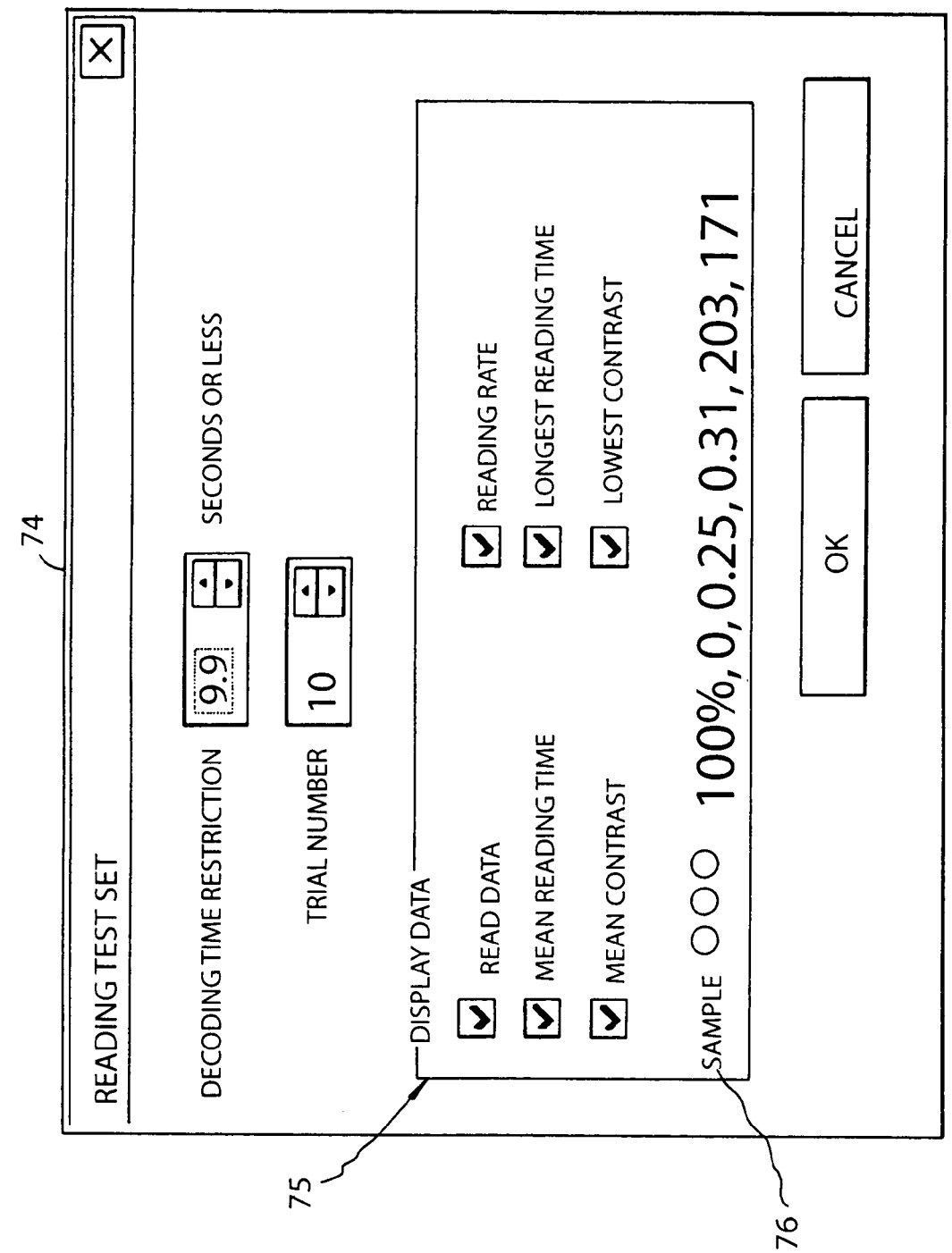
FIG. 19 is an image diagram showing the set screen of the reading test in the reading adjustment screen.

In FIGS. 17 and 18, when a "set . . . " button 73 is pressed down, a "reading test set" screen 74 shown in FIG. 19 is opened in another window and "decoding time restriction" and "trail number" can be specified. In a "display data" set column 75, moreover, "read data", "reading rate", "mean reading time", "longest reading time", "mean contrast" and "lowest contrast" can be selected as items to be included in data displayed in a reading test result display column 79 of FIGS. 17 and 18 as the result of the reading test, and a check box is checked for each item and is thus added to the display data. Moreover, a sample 76 of the selected display data is displayed in the lower stage of the "display data" set column 75 and a check box for each item is turned ON and OFF. Correspondingly, the display sample is also changed and a format in which the currently selected display data are displayed can be confirmed.

In a "display format" designating column 77 in FIGS. 17 and 18, moreover, whether acquired data are displayed as "original data" or "binary data" is selected. Thus, the reading test is set. Furthermore, when a two-dimensional code is actually set to the two-dimensional code reader and a "test start" button 78 is then pressed down, a confirmation screen for carrying out the reading test is opened and a message of "Put a two-dimensional code in a visual code field and adjust a focus, a diaphragm and an illumination position" is displayed. When an OK button is pressed down, the two-dimensional code is started to be read. When a "test start" button 78 is pressed down, a two-dimensional code reader setting program continuously carries out a reading test to display a test result in one column for each of trial times (10 defaults) designated in the "reading test set" screen 74. This operation is repeated to carry out display in a reading test result display column 79.

FIG. 17 shows an example of the case where the reading rate is high and FIG. 18 shows an example of the case where the reading rate is low. In these drawings, the read data, the reading rate, the mean reading time, the longest reading time, the mean contrast, and the lowest contrast are displayed from the left as information to be displayed in the reading test result display column 79. A reading rate of 100% is the standard of a reading stability. As compared with FIG. 17 in which the reading result is excellent, it is apparent that the case where the reading rate is low is increased, and the reading time is long and a contrast is low in FIG. 18 in which the reading result is poor. Thus, reading can be actually carried out under the set conditions and information such as the reading rate or the reading time can be thus displayed. Consequently, a reading stability can be known. Accordingly, the user can carry out the reading test to set stable conditions.

Illuminance Distribution Confirmation Mode

Figure 20:
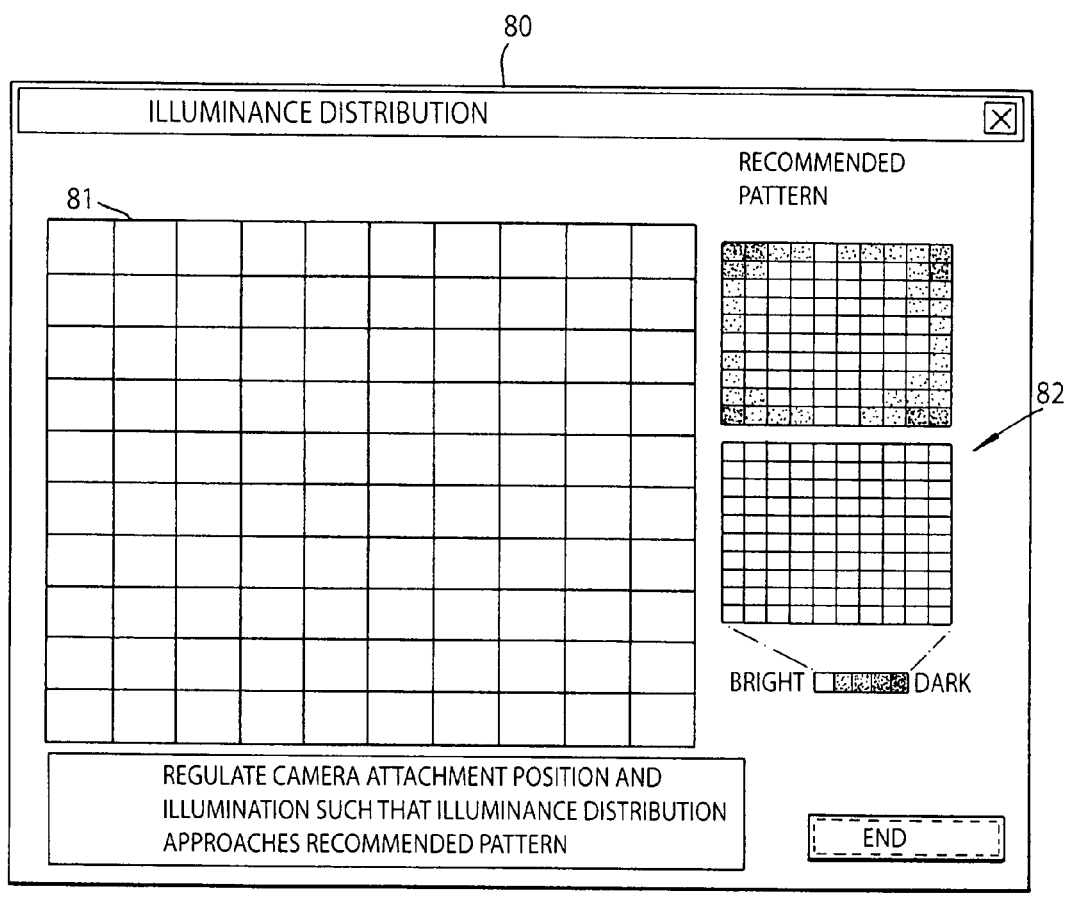
FIG. 20 is an image diagram showing an example in which an illuminance distribution is excellent as determined by an illuminance distribution test in the reading adjustment screen.
Figure 21:
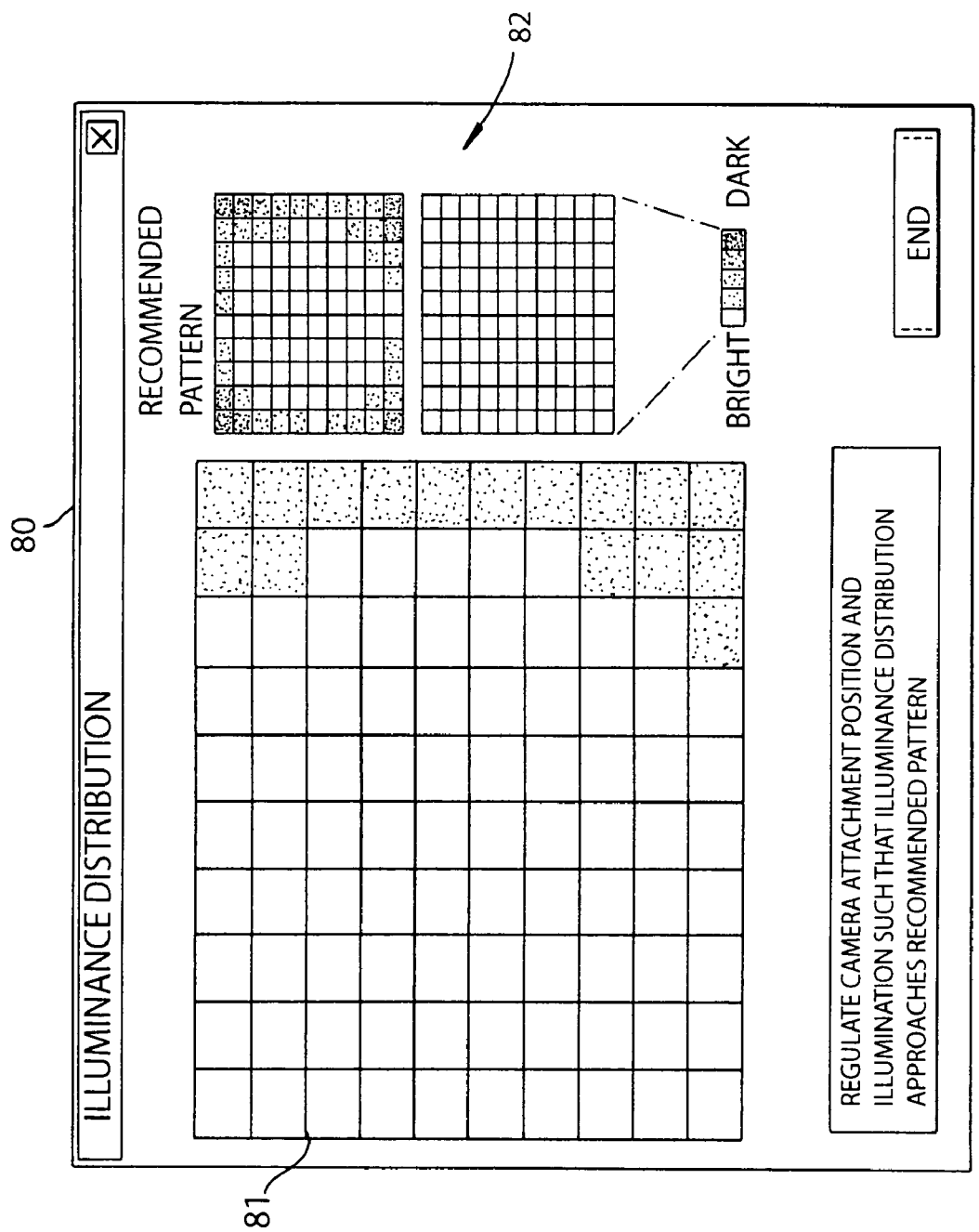
FIG. 21 is an image diagram showing another example in which the illuminance distribution is excellent as determined by the illuminance distribution test in the reading adjustment screen.
Figure 22:
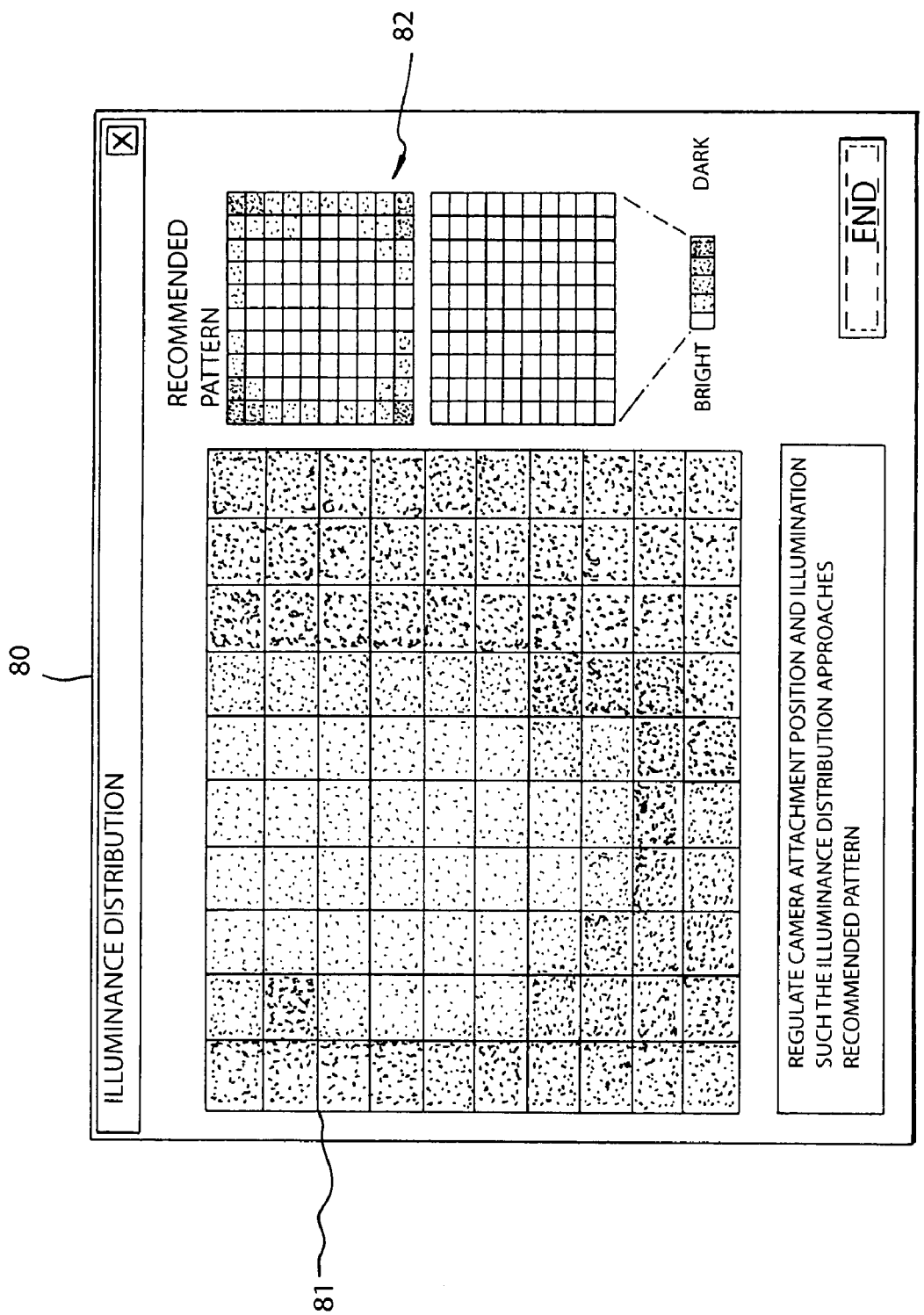
FIG. 22 is an image diagram showing an example in which the illuminance distribution is poor as determined by the illuminance distribution test in the reading adjustment screen.

Next, an illuminance distribution confirmation mode will be described. In the illuminance distribution confirmation mode, an illuminating section is operated to carry out an illumination without a two-dimensional code and a work including the two-dimensional code set to the two-dimensional code reader, and an illuminance distribution test for confirming the illuminance distribution of a background from image data acquired in an image pick-up section is executed. In FIGS. 17 and 18, when "reading regulation (T)"→"illuminance distribution test" in a menu is selected, a confirmation screen for carrying out the illuminance distribution test is opened and a message of "An illuminance distribution test will be carried out" is displayed. When an OK button is pressed down, the illuminance distribution is measured in a state in which a two-dimensional code is actually illuminated and an illuminance distribution screen 80 indicative of a measurement result is displayed in another window. An example of the result of the illuminance distribution test is shown in FIGS. 20 to 22. FIGS. 20 and 21 show a good example and FIG. 22 shows a poor example. In these drawings, a visual field is divided into blocks and an illuminance distribution is displayed in an illuminance distribution display column 81 on the left side. A mean lightness is calculated as a mean illuminance for each block and an illuminance is displayed with a color varied stepwise, for example, in a white color with an increase in an illuminance and a black color with a reduction in the illuminance as in a scale displayed on a lower right part.

Moreover, a preferred example of the illuminance distribution is indicated as a "recommended pattern" 82 on the right side. By referring to the recommended pattern 82, an illuminance distribution confirmation test is repeated while changing the setting. An illuminance distribution pattern can be set to approach the recommended pattern by a confirmation through the illuminance distribution display column 81. FIG. 20 shows a uniform distribution with a sufficient high illuminance. In FIG. 21, moreover, a portion having a slightly poor illuminance is present on the right side but a sufficient illuminance is obtained. On the other hand, in FIG. 22, the whole portion is dark and a sufficient illuminance is not obtained. Accordingly, in the case where the illuminance distribution shown in FIG. 22 is displayed, the amount of light, an attachment position and an angle of an illuminator and the like are adjusted to approach the recommended pattern. The illuminance distribution test is carried out again in the adjustment state, and whether the illuminance distribution is improved is confirmed. Thus, the user can adjust the illumination while confirming the illuminance distribution.

In this example, acquired image data having 640×480 pixels are divided into rectangular blocks having 64×48 pixels and a mean illuminance is measured every 10×10 blocks. This block corresponds to a block in a binary method of image data.

Binary Method

There are various binary methods for changing the analog signal of image data to a binary value. In the screen of FIG. 12, when the "binary detail" button 54 is pressed down, a "binary option" screen 83 in FIG. 23 is displayed and the binary method can be selected and set in a "binary method" set column 84. In this example, any of a division binary 1, a division binary 2, and fixation can be selected.

In the "division binary 1", image data are divided into a plurality of blocks (for example, 16×16 pixels) as described above and a change into a binary value is carried out based on the mean lightness of each block and the fixed threshold of a whole image. The two-dimensional code reader automatically calculates the fixed threshold of the whole image as will be described below, and the user does not need to specify the fixed threshold. This method is used in the case where both an uneven lightness and a background noise are comparatively increased. In the case where each of the unevenness and the noise is great, any of the following methods is preferable according to the unevenness and the noise.

Moreover, the "division binary 2" is a method of dividing image data into a plurality of blocks and carrying out a change into a binary value based on the mean lightness of each block. In this method, a lightness histogram is obtained for each block to calculate a mean lightness and a binary threshold is varied for each block. This method is used in the case where the uneven lightness is great and the background noise is small. Such division binary change is effective for the case where a change into a binary value based on the fixed threshold of a whole image has a problem. For example, in the case where the illuminator does not carry out uniform illumination and a gradation in which a bright portion and a dark portion are unevenly distributed on the acquired image data is generated, there is caused such a situation that the change into the binary value is carried out based on the whole screen so that a bias is generated and the change into a binary value cannot be carried out accurately. In such a case, an image is divided to set a binary threshold in each region. Consequently, binary data can be obtained correctly.

On the other hand, the "fixation" indicates a method of changing the whole image data into a binary value with a constant fixed threshold. In this method, the user can directly specify the fixed threshold differently from the "division binary 1". In the screen of FIG. 23, when the "fixation" is selected, a "binary level" input column 85 is changed from gray-out into a state in which the input can be carried out, and the user inputs a fixed threshold as the "binary level". This method is used in the case where the uneven lightness is small and the background noise is great.

The user can directly specify the fixed threshold, and furthermore, can cause the two-dimensional code reader to calculate the fixed threshold. The fixed threshold can be calculated from a histogram indicative of the lightness distribution of the whole image, for example. By the histogram, a central lightness in each of a bright portion (white) and a dark portion (black) can be obtained and a contrast of a difference can also be utilized as the index of the reading stability. In order to calculate the fixed threshold in this example, "binary level automatic detection" is selected from "reading adjustment (T)" of the menu in the reading adjustment screen of FIGS. 17 and 18. Consequently, a dialog box of "An appropriate binary level for fixing a binary method is automatically detected. Put a two-dimensional code in a visual field and adjust a focus, a diaphragm and an illuminator position," is displayed. When the "OK" button is pressed down, the binary level automatic detection is executed. A message of "Binary level automatic detection. The binary level is being automatically detected. Please wait for a while," is displayed and an optimum fixed threshold is calculated in approximately one minute. An operation value can be displayed on a screen if necessary, and furthermore, can be automatically set as a fixed threshold.

There are various binary methods, and the user selects an appropriate binary method corresponding to the use conditions of the two-dimensional code reader. In that case, the operation test and the illuminance distribution confirmation described above are effective. More specifically, the illuminance distribution is first confirmed and the two-dimensional code reading is then tested actually before the two-dimensional code reader is applied. Consequently, it is possible to previously confirm whether or not an optimum binary method is selected. Also in each binary method, moreover, each set value can be regulated to a more optimum value. Referring to the above-mentioned reading conditions other than the binary method, furthermore, an appropriate value can be set. For example, if it is clear that the reading stability is poor as a result of the reading test in step S4, the processing returns to step S2 and the setting can be changed and adjusted to such setting as to solve the problems. The reading test is carried out again on the changed condition. If the execution of the stable reading can be confirmed, the setting is ended. An operation for feeding back the result of a reading trial to search for more preferable conditions and further carrying out a trial can be repetitively executed to finally obtain an optimum condition. Moreover, it is possible to set the two-dimensional code reading condition to meet a desirable purpose such as an enhancement in reading precision or an enhancement in a reading speed. Furthermore, the test is carried out before the two-dimensional code reader is introduced or applied, and a two-dimensional code is actually read so that a reading stability or the like can be confirmed. Consequently, it is also possible to obtain an advantage to prevent a problem, for example, an insufficient reading rate is clear after the start of the application.

As described above, it is possible to implement a feature that the two-dimensional code reader setting method, the two-dimensional code read setting device, the two-dimensional code reader setting program, and the computer readable recording medium according to the present invention can easily set the conditions for reading a two-dimensional code such as an image pick-up optical system. The reason is that a user is caused to specify necessary set conditions and an optimum set condition is automatically calculated. When the user inputs a necessary item, an appropriate value, for example, an image pick-up section attachment distance, the thickness of a close-up ring, or the scale of a focusing ring is automatically calculated. Therefore, the user can exactly carry out the setting so that the condition for reading the two-dimensional code can be obtained. Consequently, it is possible to set easy reading conditions more rapidly than a method of searching for the condition setting manually with reference to a correspondence table as in the conventional art. In particular, even a user who does not know much about a two-dimensional code can simply input a necessary item so that the necessary item to be set is calculated and displayed. Thus, the conditions can be determined without difficulty. Furthermore, a user who knows much about the two-dimensional code can directly specify some items. Therefore, it is possible to quickly obtain a necessary result. Thus, an operating property is not deteriorated. According to the present invention, thus, it is possible to implement an advantageous feature in that appropriate condition settings can easily be carried out regardless of the user's ability.

Legend for Figures and Words in Figures

FIG. 1
(1): DECODING SECTION
(2): IMAGE PICK-UP SECTION
(3): ILLUMINATING SECTION
(4): CAMERA
(5): LENS
(6): IMAGE PROCESSING CIRCUIT
(7): OPERATION CIRCUIT
(8): READING STABILITY OUTPUT CIRCUIT
(9): CONTROL SECTION
(10): IMAGE PROCESSING SECTION
(11): DECODE PROCESSING SECTION
(12): READING STABILITY DETERMINING SECTION
(13): SERIAL INPUT/OUTPUT SECTION
(14): HOST SYSTEM
(15): TWO-DIMENSIONAL CODE

FIG. 2
(1): START
(2): DETERMINE A TWO-DIMENSIONAL CODE SPECIFICATION
(3): DETERMINE A CAMERA ATTACHMENT CONDITION
(3): SET A TWO-DIMENSIONAL CODE READING OPERATION
(4): REGULATE READING
(5): END

FIG. 3
(1): SET SOFTWARE
(2): FILE (F)
  PC COMMUNICATION SET (C)
  HELP (H)
(3): DETERMINE 2D CODE SPECIFICATION
(4): DETERMINE CAMERA ATTACHMENT DISTANCE
(5): SET BODY OPERATION
(6): REGULATE READING
(7): DETERMINE 2D CODE SPECIFICATION
(8): CODE TYPE
(9): QR CODE
  MICRO QR CODE
  SQUARE DATA MATRIX
  RECTANGULAR DATA MATRIX
(10): DETAILS
(11): DATA TYPE
(12): FIGURE
  ALPHANUMERICS
  BINARY
  KANJI
(13): DATA VOLUME
(14): DIGIT
(15): PRINTABLE SPACE
(16): LENGTH
(17): WIDTH
(18): START CALCULATION
(19): CELL SIZE
(20): CELL OR LESS
(21): SYMBOL SIZE
(22): OR LESS
(23): PRINTING DETAILS

FIG. 4
(24): QR CODE DETAILS
(25): MODEL
(26): ERROR CORRECTING LEVEL
(27): DOT PATTERN
(28): CANCEL

FIG. 5
(1): SET PRINTING DETAILS
(2): DETERMINE CELL SIZE FOR PRINTING. SELECT ROW AND PUSH OK.
(3): INPUT PRINTING PRECISION IF PRINTING PRECISION IS DIFFERENT FROM THAT OF YOUR THERMAL PRINTER.
(4): CELL SIZE
(5) mm/CELL OR LESS
(6): PRINTING PRECISION
(7): RECALCULATION
(8): PRINTER RESOLUTION
(9): DOT NUMBER DOT/CELL
(10): CELL SIZE FOR PRINTING
(11): SYMBOL SIZE FOR PRINTING
(12): CANCEL

FIG. 6
(1): SET SOFTWARE
(2): FILE (F)
PC COMMUNICATION SET (C)
HELP (H)
(3): DETERMINE TWO-DIMENSIONAL CODE SPECIFICATION
(4): DETERMINE CAMERA ATTACHMENT DISTANCE
(5): SET BODY OPERATION
(6): REGULATE READING
(7): SET CAMERA ATTACHMENT DISTANCE
(8): TWO-DIMENSIONAL CODE SPECIFICATION
(9): CELL SIZE
(10): SYMBOL SIZE (INCLUDING MARGIN)
(11): LENGTH
(12): WIDTH
(13): LABEL SHIFT RANGE
(14): ROTATION
(15): PRINTING PATTERN
(16): NORMAL
(17): DOT
(18): ATTACHMENT DISTANCE LIMITATION
(19): NO
(20): YES
(21): ATTACHMENT DISTANCE
CLOSE-UP RING
(22): VISUAL FIELD
(23): ATTACHMENT CONDITION DETAILS
(24): START CALCULATION

FIG. 7
(1): 2D CODE SPECIFICATION
(2): CALCULATE SYMBOL SIZE
(3): WORK POSITIONING PRECISION
(4): DESIRED ATTACHMENT DISTANCE
(5): CAMERA ATTACHMENT DISTANCE
CLOSE-UP RING TO BE USED
FOCUSING RING

FIG. 8
(6): CALCULATE SYMBOL SIZE
(7): CALCULATE SYMBOL SIZE FROM CODE TYPE, VERSION (CODE SIZE) AND CELL SIZE. INQUIRE AT LABEL CREATION SOURCE IF THESE INFORMATION ARE NOT KNOWN.
(8): CODE TYPE
(9): QR CODE
MICRO QR CODE
SQUARE DATA MATRIX
RECTANGULAR DATA MATRIX
(10): VERSION
CELL SIZE
(11): SYMBOL SIZE
CONNECT WITH A SYMBOL SIZE

FIG. 9
(1): ATTACHMENT CONDITION DETAILS
(2): FOCUSING RANGE
(3): RATE OF CODE TO VISUAL FIELD
(4): CLOSE-UP RING COMBINATION
TOTAL 6.5 MM
(0.5+1.0+5.0)
ATTACHMENT RANGE
65 mm TO 91 mm
(5): VISUAL FIELD
ATTACHMENT DISTANCE
FOCUS SCALE
PIXEL/CELL

FIG. 10
(1): ATTACHMENT IMAGE

FIG. 11
(1): SET XXX OPERATION
(2): READING CODE
READING OPERATION
OUTPUT
PREDICTIVE MAINTENANCE INFORMATION
COMMUNICATION
OTHERS
(3): SET A READING CODE
(4): QR CODE
MICRO QR CODE
DATA MATRIX CODE
OTHER CODES
(5): SET DETAILS OF OTHER CODES
(6): INSPECT CHECK DIGIT
(7): INSPECT CHECK DIGIT
TRANSFER NW-7 START STOP CHARACTER
(8): INSPECT CHECK DIGIT
(9): RESTRICT THE NUMBER OF DIGITS OF BAR CODE
(10): 2D CODE PRINTING STATE
(11): INVERT WHITE AND BLACK (I)
INVERT BOTH SIDES (F)
(12): PRINTING PATTERN
NORMAL
DOT (QR MICRO QR)
DOT (DATA MATRIX)
(13): TRANSMITTING AND RECEIVING SOURCE
(14): MEMORY 1

FIG. 12
(1): READING MODE
(2): SINGLE LABEL
LEVEL TRIGGER
EDGE TRIGGER
SOFT TRIGGER
(3): MULTI-LABEL
LEVEL TRIGGER
CONTINUOUS
(4): READING MODE DETAILS
(5): INPUT TIME CONSTANT MILLISECOND (7): TRIGGER ON COMMAND
TRIGGER OFF COMMAND
(8): RE-READING PREVENTING TIME SECOND
(9): BINARY DETAILS

FIG. 13
(1): OUTPUT TIMING
(2): AFTER READING
AFTER TRIGGER OFF
(3): OK TERMINAL OUTPUT
NG TERMINAL OUTPUT
(4): OUTPUT ON TIME
TERMINAL OUTPUT DELAY TIME
(5): READING ERROR CODE OUTPUT
READING ERROR CODE
(6): TRANSFER DATA DETAILS

FIG. 14
(1): SET PREDICTIVE MAINTENANCE INFORMATION (PMI). THE PREDICTIVE MAINTENANCE INFORMATION CAN BE OUTPUTTED FROM PM TERMINAL OR CAN BE ADDED TO READ DATA AND SERIALLY TRANSFERRED.
(2): PM TERMINAL OUTPUT
(3): PREDICTIVE MAINTENANCE INFORMATION (PMI)
ADD TO READ DATA
PREDICTIVE MAINTENANCE SET VALUE 1
PREDICTIVE MAINTENANCE SET VALUE 2

FIG. 15
4: COMMUNICATION SPEED (R)
(5): DATA LENGTH (L)
(6): STOP BIT (S)
(7): FLOW CONTROL
RTS/CTS CONTROL
MONITORING TIME
SECOND
(8): COMMUNICATION MEANS
NO PROCEDURE
MONITORING TIME
SECOND
(9): AFTER SETTING TRANSMISSION, REFLECT PC COMMUNICATION SETTING.
(10): PARITY (P)
NOTHING
EVEN NUMBER
ODD NUMBER
(11): HEADER, TERMINATOR
(12): NOTHING, CR LF

FIG. 16
(1): EXTERNAL ILLUMINATION OUTPUT
(2): PERMIT BUZZER OPERATION
(3): MONITOR DISPLAY READ DATA
SET IMAGE SAVING (MAXIMUM 10 SCREENS)
SAVE ONLY NG IMAGE
SAVE ONLY OK IMAGE
SAVE ALL IMAGES

FIG. 17
(4): REGULATE READING
TRANSMITTED COMMAND
(5): SET
(6): RECEIVED DATA
CLEAR A HISTORY
(7): DISPLAY FORMAT
ORIGINAL IMAGE
BINARY IMAGE
(8): START TEST
END TEST
(9): EXAMPLE

FIG. 18
(1): SET READING TEST
(2): DECODE TIME LIMITATION WITHIN SECOND
(3): NUMBER OF TRIALS
(4): DISPLAY DATA
READ DATA
READING RATE
MEAN READING TIME
LONGEST READING TIME
MEAN CONTRAST
LOWEST CONTRAST

FIG. 20
(1): ILLUMINANCE DISTRIBUTION
(2): RECOMMENDED PATTERN
(3): REGULATE CAMERA ATTACHMENT POSITION AND ILLUMINATION SUCH THAT ILLUMINANCE DISTRIBUTION APPROACHES RECOMMENDED PATTERN.
(4): BRIGHT
(5): DARK
(6): END

FIG. 23
(1): BINARY OPTION
(2): THESE SET ITEMS DO NOT NEED TO BE USUALLY CHANGED.
(3): BINARY MODE
DIVIDED BINARY CHANGE 1
DIVIDED BINARY CHANGE 2
FIX BINARY LEVEL
(4): A/D CONVERSION REFERENCE VALUE
UPPER LIMIT
LOWER LIMIT
(5): DIGITAL FILTER SMOOTHING
(6): SIZE
(7): SET DOT PATTERN
AUTOMATIC (RECOMMENDED)
SET
(8): DOT SIZE
GAP SIZE
(9): INITIAL VALUE

What is claimed is:

1. A method of setting a two-dimensional code reader for reading a two-dimensional code by using an image pick-up section, comprising the steps of:

designating a specification of the two-dimensional code including one or more of a code type, a model, an error correcting level, a printing pattern, a data type for encoding the two-dimensional code, a data volume, a printable space or printing precision of the two-dimensional code;

calculating the specification of the two-dimensional code including one or more of a cell size or a symbol size of the two-dimensional code in accordance with the designated condition;

designating an attachment condition of the image pick-up section including one or more of an attachment distance limitation of the image pick-up section, a shift tolerance of a two-dimensional code label, presence or absence of rotation, a cell size of the two-dimensional code or a printing pattern; and calculating an attachment specification including one or more of the attachment distance of the image pick-up section, a focusing range, a size of a visual field, the number of pixels to be allocated to one cell, a total thickness of close-up rings, a combination of a thickness of each of the necessary close-up rings and the number thereof, or a standard of a scale of a focusing ring in accordance with the specification of the calculated two-dimensional code and the attachment condition of the image pick-up section.

2. A method of setting a two-dimensional code reader for reading a two-dimensional code by using an image pick-up section, comprising the steps of:

designating a specification of the two-dimensional code including at least a volume of data to be encoded into the two-dimensional code and a printable space or a symbol size of the two-dimensional code; and calculating an attachment specification including at least an attachment distance of the image pick-up section and a total thickness of close-up rings in accordance with the specification of the two-dimensional code.

3. The method of setting a two-dimensional code reader according to claim 2, wherein cell size of the two-dimensional code is calculated as the specification of the two-dimensional code based on at least the volume of data to be encoded into the two-dimensional code and the printable space or the symbol size of the two-dimensional code and is determined based thereon.

4. The method of setting a two-dimensional code reader according to claim 2, wherein the cell size of the two-dimensional code is calculated as the specification of the two-dimensional code based on a maximum value which can be permitted as at least the cell size and a resolution of a printer of the two-dimensional code and is determined based thereon.

5. The method of setting a two-dimensional code reader according to claim 2, further comprising the steps of:

specifying an attachment condition of the image pick-up section including at least an attachment distance limitation of the image pick-up section; and calculating an attachment specification including at least an attachment distance of the image pick-up section and a total thickness of the close-up rings based on the specification of the two-dimensional code and the attachment condition of the image pick-up section.

6. The method of setting a two-dimensional code reader according to claim 2, further comprising the steps of:

specifying an attachment condition of the image pick-up section including any of at least a shift tolerance of a two-dimensional code label, presence or absence of rotation and a printing pattern; and calculating an attachment specification including at least an attachment distance of the image pick-up section and a total thickness of the close-up rings based on the specification of the two-dimensional code and the attachment condition of the image pick-up section.

7. The method of setting a two-dimensional code reader according to claim 1, further comprising the step of:

displaying at least any of an attachment distance of the image pick-up section related to calculation, a total thickness of close-up rings or a combination of a thickness of each of necessary close-up rings and the number thereof, a standard of a scale of a focusing ring, a length and width of a symbol of the two-dimensional code, a size of one cell, a length and width of a two-dimensional code label having the two-dimensional code printed thereon, a shift tolerance of the two-dimensional code label, presence or absence of rotation, and a relationship between a visual field and a symbol size, in an image.

8. The method of setting a two-dimensional code reader according to claim 1, wherein a candidate group of the total thickness of the close-up rings or the combination of the thickness of each of the necessary close-up rings and the number thereof is calculated, a focusing range is visually displayed for each of the candidates, any of the candidate groups displayed side by side is selected so that at least any of an attachment distance of the image pick-up section related to the selected candidate, a focusing range, a size of a visual field, the number of pixels to be allocated to one cell, the total thickness of the close-up rings, the combination of the thickness of each of the necessary close-up rings and the number thereof, and a standard of a scale of a focusing ring is displayed.

9. The method of setting a two-dimensional code reader according to claim 1, further comprising the step of:

setting an operation of the two-dimensional code reader including any of specification of a code to be read by the two-dimensional code reader, specification of a reading operation, output, predictive maintenance information and communication.

10. A method of setting a two-dimensional code reader for reading a two-dimensional code by using an image pick-up section, comprising the steps of:

designating a specification of the two-dimensional code including at least a code type of the two-dimensional code, a volume of data to be encoded into the two-dimensional code, a cell size of the two-dimensional code and a printable space or a symbol size of the two-dimensional code; and calculating an attachment specification including at least an attachment distance of the image pick-up section and a total thickness of close-up rings in accordance with the specification of the two-dimensional code.

11. A method of setting a two-dimensional code reader for reading a two-dimensional code by using an image pick-up section, comprising the steps of:

designating a specification of the two-dimensional code including at least any of a volume of data to be encoded into the two-dimensional code and a cell size of the two-dimensional code; and calculating an attachment specification including at least an attachment distance of the image pick-up section and a total thickness of close-up rings in accordance with the specification of the two-dimensional code.

12. A method of setting a two-dimensional code reader for reading a two-dimensional code by using an image pick-up section, comprising the steps of:

designating a specification of the two-dimensional code including at least any of a cell size of the two-dimensional code and a printable space or a symbol size of the two-dimensional code; and calculating an attachment specification including at least an attachment distance of the image pick-up section and a total thickness of close-up rings in accordance with the specification of the two-dimensional code.

13. A method of setting a two-dimensional code reader for reading a two-dimensional code by using an image pick-up section, comprising the steps of:

designating a two-dimensional code reading specification including at least any of a volume of data to be encoded into the two-dimensional code, a printable space or a symbol size of the two-dimensional code, and an attachment distance of the image pick-up section; and calculating an attachment specification including at least a total thickness of close-up rings in accordance with the two-dimensional code reading specification.

14. A method of setting a two-dimensional code reader for reading a two-dimensional code by using an image pick-up section, comprising the steps of:
designating a two-dimensional code reading specification including at least any of a volume of data to be encoded into the two-dimensional code, a cell size of the two-dimensional code, and an attachment distance of the image pick-up section; and
calculating an attachment specification including at least a total thickness of close-up rings in accordance with the two-dimensional code reading specification.

15. A method of setting a two-dimensional code reader for reading a two-dimensional code by using an image pick-up section, comprising the steps of:
designating a two-dimensional code reading specification including at least any of a cell size of the two-dimensional code, and a printable space or a symbol size of the two-dimensional code; and
calculating an attachment specification including at least a total thickness of close-up rings in accordance with the two-dimensional code reading specification.

16. A two-dimensional code read setting device for setting a two-dimensional code reading operation for reading a two-dimensional code by using an image pick-up section and decoding the two-dimensional code by using a two-dimensional code reader, comprising:
a two-dimensional code specification designating section for designating a specification of the two-dimensional code including any of a code type, a model, an error correcting level, a printing pattern, a data type for encoding the two-dimensional code, a data volume, a printable space and printing precision of the two-dimensional code read by the image pick-up section;
a two-dimensional code specification calculating section for calculating the specification of the two-dimensional code including any of a cell size and a symbol size of the two-dimensional code in accordance with the condition designated by the two-dimensional code specification designating section;
an image pick-up section attachment condition designating section for designating an attachment condition of the image pick-up section including any of an attachment distance limitation of the image pick-up section, a shift tolerance of a two-dimensional code label, presence or absence of rotation, a cell size of the two-dimensional code and a printing pattern; and
an image pick-up section attachment specification calculating section for calculating an attachment specification including any of the attachment distance of the image pick-up section, a focusing range, a size of a visual field, the number of pixels to be allocated to one cell, a total thickness of close-up rings, a combination of a thickness of each of the necessary close-up rings and the number thereof, and a standard of a scale of a focusing ring in accordance with the specification of the two-dimensional code which is calculated by the two-dimensional code specification calculating section and the attachment condition of the image pick-up section which is designated by the image pick-up section attachment condition designating section.

17. The two-dimensional code reader setting device according to claim 16, further comprising:
a two-dimensional code reading operation setting section for setting an operation of the two-dimensional code reader including any of specification of a code to be read by the two-dimensional code reader, specification of a reading operation, output, predictive maintenance information and communication.

18. A two-dimensional code reader setting program for setting a two-dimensional code reader for reading a two-dimensional code by using an image pick-up section, which causes a computer to implement functions of:
designating a specification of the two-dimensional code including any of a code type of the two-dimensional code, a model, an error correcting level, a printing pattern, a data type to be encoded into the two-dimensional code, a data volume, a printable space and printing precision;
calculating the specification of the two-dimensional code including any of a cell size and a symbol size of the two-dimensional code in accordance with the designated condition;
designating an attachment condition of the image pick-up section including any of an attachment distance limitation of the image pick-up section, a shift tolerance of a two-dimensional code label, presence or absence of rotation, a cell size of the two-dimensional code and a printing pattern; and
calculating an attachment specification including any of the attachment distance of the image pick-up section, a focusing range, a size of a visual field, the number of pixels to be allocated to one cell, a total thickness of close-up rings, a combination of a thickness of each of the necessary close-up rings and the number thereof, and a standard of a scale of a focusing ring in accordance with the specification of the two-dimensional code and the attachment condition of the image pick-up section.

19. The two-dimensional code reader setting program according to claim 18, which further causes the computer to implement a function of:
saving an image of the two-dimensional code acquired by the image pick-up section.

20. The two-dimensional code reader setting program according to claim 18, which further causes the computer to implement a function of:
printing set contents which are calculated.

21. The two-dimensional code reader setting program according to claim 18, which further causes the computer to implement a function of:
saving the set contents which are calculated in a file.

22. A computer readable recording medium recording the two-dimensional code reader setting program according to claim 18.

* * * * *